United States Patent
Han et al.

(10) Patent No.: US 10,066,789 B2
(45) Date of Patent: Sep. 4, 2018

(54) METHOD OF AUTOMATICALLY INSPECTING INTERNAL GAS LEAK AND METHOD OF MANUFACTURING LED CHIP

(71) Applicant: SAMSUNG ELECTRONICS CO., LTD., Suwon-si, Gyeonggi-do (KR)

(72) Inventors: Kung-don Han, Suwon-si (KR); Young-ki Kim, Suwon-si (KR); In Kim, Suwon-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 278 days.

(21) Appl. No.: 14/795,641

(22) Filed: Jul. 9, 2015

(65) Prior Publication Data
US 2016/0033353 A1    Feb. 4, 2016

(30) Foreign Application Priority Data
Jul. 29, 2014    (KR) .......................... 10-2014-0096769

(51) Int. Cl.
G01M 3/04    (2006.01)
F17D 5/06    (2006.01)
G01M 3/28    (2006.01)

(52) U.S. Cl.
CPC ............. *F17D 5/06* (2013.01); *G01M 3/2815* (2013.01)

(58) Field of Classification Search
CPC ........ G01M 3/20; G01M 3/229; G01M 3/205; G01M 3/22; G01M 3/04

USPC .......................................................... 73/40.7
See application file for complete search history.

(56) References Cited

U.S. PATENT DOCUMENTS

| | | | | | |
|---|---|---|---|---|---|
| 2,981,091 | A | * | 4/1961 | Roberts | G01M 3/207 73/1.05 |
| 3,043,129 | A | * | 7/1962 | King | G01M 3/04 73/40 |
| 3,156,238 | A | * | 11/1964 | Bird | A61M 16/00 128/205.15 |
| 3,416,500 | A | * | 12/1968 | Lyons | F22B 37/421 122/406.4 |
| 3,523,527 | A | * | 8/1970 | Foster | A61M 16/00 128/204.21 |
| 3,616,680 | A | * | 11/1971 | Schrader | F04D 19/046 73/40.7 |
| 3,962,905 | A | * | 6/1976 | Jouve | F17D 5/06 73/40.5 R |

(Continued)

FOREIGN PATENT DOCUMENTS

KR    10-1999-0025801 A    4/1999
KR    10-2006-0131075 A    12/2006
(Continued)

*Primary Examiner* — Eric S McCall
*Assistant Examiner* — Mohammed E Keramet-Amircola
(74) *Attorney, Agent, or Firm* — Muir Patent Law, PLLC

(57) ABSTRACT

A method of inspecting an internal gas leak in a gas line includes providing an internal gas leak inspection device including a main valve and a pressure gauge in a main line between a first valve and a second valve in the gas line, forming an airtight space in the main line by shielding the main valve and the second valve, measuring a pressure variation of the airtight space using the pressure gauge, and determining whether or not the gas leak occurs, based on the measured pressure variation.

13 Claims, 15 Drawing Sheets

(56) References Cited

U.S. PATENT DOCUMENTS

| | | | |
|---|---|---|---|
| 5,637,788 A * | 6/1997 | Remboski | F02M 25/0809 73/40.5 R |
| 5,827,950 A | 10/1998 | Woodbury et al. | |
| 5,866,802 A | 2/1999 | Kimata et al. | |
| 6,167,749 B1 | 1/2001 | Yanagisawa et al. | |
| 6,372,608 B1 | 4/2002 | Shimoda et al. | |
| 6,645,830 B2 | 11/2003 | Shimoda et al. | |
| RE38,466 E | 3/2004 | Inoue et al. | |
| 6,818,465 B2 | 11/2004 | Biwa et al. | |
| 6,818,530 B2 | 11/2004 | Shimoda et al. | |
| 6,858,081 B2 | 2/2005 | Biwa et al. | |
| 6,967,353 B2 | 11/2005 | Suzuki et al. | |
| 7,002,182 B2 | 2/2006 | Okuyama et al. | |
| 7,084,420 B2 | 8/2006 | Kim et al. | |
| 7,087,932 B2 | 8/2006 | Okuyama et al. | |
| 7,154,124 B2 | 12/2006 | Han et al. | |
| 7,208,725 B2 | 4/2007 | Sherrer et al. | |
| 7,288,758 B2 | 10/2007 | Sherrer et al. | |
| 7,319,044 B2 | 1/2008 | Han et al. | |
| 7,501,656 B2 | 3/2009 | Han et al. | |
| 7,709,857 B2 | 5/2010 | Kim et al. | |
| 7,790,482 B2 | 6/2010 | Han et al. | |
| 7,759,140 B2 | 7/2010 | Lee et al. | |
| 7,781,727 B2 | 8/2010 | Sherrer et al. | |
| 7,994,525 B2 | 4/2011 | Lee et al. | |
| 7,940,350 B2 | 5/2011 | Jeong | |
| 7,945,414 B2 | 5/2011 | Nagase et al. | |
| 7,959,312 B2 | 6/2011 | Yoo et al. | |
| 7,964,881 B2 | 6/2011 | Choi et al. | |
| 7,985,976 B2 | 7/2011 | Choi et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,129,711 B2 | 3/2012 | Kang et al. | |
| 8,179,938 B2 | 5/2012 | Kim | |
| 8,263,987 B2 | 9/2012 | Choi et al. | |
| 8,324,646 B2 | 12/2012 | Lee et al. | |
| 8,399,944 B2 | 3/2013 | Kwak et al. | |
| 8,432,511 B2 | 4/2013 | Jeong | |
| 8,459,832 B2 | 6/2013 | Kim | |
| 8,502,242 B2 | 8/2013 | Kim | |
| 8,536,604 B2 | 9/2013 | Kwak et al. | |
| 8,735,931 B2 | 5/2014 | Han et al. | |
| 8,766,295 B2 | 7/2014 | Kim | |
| 2003/0000288 A1 * | 1/2003 | Weldon | F02M 25/0809 73/40 |
| 2003/0037816 A1 * | 2/2003 | Caparros | F16K 1/304 137/266 |
| 2005/0056081 A1 * | 3/2005 | Gocho | G01M 3/2815 73/40 |
| 2005/0129529 A1 * | 6/2005 | Cho | F04B 19/006 417/207 |
| 2008/0173072 A1 * | 7/2008 | Home | G01M 3/002 73/40 |
| 2008/0273205 A1 * | 11/2008 | Lee | G01N 21/253 356/440 |
| 2013/0306160 A1 * | 11/2013 | Chung | G01N 35/00069 137/13 |
| 2014/0102565 A1 | 4/2014 | Jackson et al. | |

FOREIGN PATENT DOCUMENTS

| | | |
|---|---|---|
| KR | 10-2008-0086172 A | 9/2008 |
| KR | 10-2010-0077956 A | 7/2010 |

* cited by examiner

METHOD OF AUTOMATICALLY INSPECTING INTERNAL GAS LEAK AND METHOD OF MANUFACTURING LED CHIP

CROSS-REFERENCE TO RELATED APPLICATION

This application claims the benefit of priority to Korean Patent Application No. 10-2014-0096769, filed on Jul. 29, 2014, in the Korean Intellectual Property Office, the disclosure of which is incorporated herein in its entirety by reference.

BACKGROUND

The inventive concept relates to a method of inspecting an internal gas leak in a gas line and a method of manufacturing a light-emitting diode (LED) using a preventive maintenance system using the inspection method.

An LED chip manufacturing system performs a process of cleaning the inside of a chamber to uniformly maintain performance of the LED chip manufacturing system. Chlorine ($Cl_2$) gas is mainly used for the cleaning process. Although the chlorine gas has high cleaning performance, powder may be generated during a reaction of the chlorine gas with hydrogen ($H_2$) gas or ammonia ($NH_3$), and a gas line may be clogged due to the powder. When an internal gas leak occurs in a valve of the gas line to which the chlorine gas is supplied, a leak of chlorine gas may react with the hydrogen gas or ammonia gas, and thus, powder is generated, and equipment may be damaged due to the clogging of the gas line. The internal gas leak may lead to a reduction in yield, an increase in damage to LED chips, and a drop in a rate of operation of equipment, thereby reducing productivity.

SUMMARY

The inventive concept provides a method of inspecting an internal gas leak in a gas line.

Also, the inventive concept provides a method of manufacturing a light-emitting diode (LED) using an LED chip manufacturing system including a gas line, which is configured to perform a preventive maintenance process.

Furthermore, the inventive concept provides a method of manufacturing a semiconductor device using a semiconductor device manufacturing system, which includes a method of inspecting an internal gas leak.

According to an aspect of the inventive concept, there is provided a method of inspecting an internal leak of gas in a gas line. The method includes providing an internal gas leak inspection device including a main valve and a pressure gauge in a main line between a first valve and a second valve in the gas line, forming an airtight space in the main line by shielding the main valve and the second valve, measuring a pressure variation of the airtight space using the pressure gauge, and determining whether or not the gas leak occurs, based on the measured pressure variation.

The main valve may be a pneumatic valve.

The gas line may be a chamber cleaning gas line of a chemical vapor deposition (CVD) apparatus or a portion thereof.

The gas may be chlorine gas.

The inside of the airtight space may be in a vacuum state.

An inner pressure of the airtight space may be higher than an inner pressure of an upstream line of the main valve and an inner pressure of a downstream line of the second valve.

The internal gas leak inspection device may further include a monitoring device configured to show results obtained by measuring the pressure variation of the airtight space.

The monitoring device may generate an alarm when a pressure variation is a predetermined value or higher.

The internal gas leak inspection device may further include a detector configured to detect elements of gas in the main line.

According to another aspect of the inventive concept, there is provided a method of manufacturing an LED chip. The method includes performing a preventive maintenance operation and performing an LED chip manufacturing operation subsequent to the preventive maintenance operation. The performing of the preventive maintenance operation may include providing an internal gas leak inspection device including a main valve and a pressure gauge in a main line between a first valve and a second valve in a gas line, forming an airtight space in the main line by shielding the main valve and the second valve, measuring a pressure variation of the airtight space using the pressure gauge, and determining whether or not a leak of gas occurs, based on the measured pressure variation. The performing of the LED chip manufacturing operation may include manufacturing the LED chip using an LED chip manufacturing system including the gas line configured to perform the preventive maintenance operation.

The main valve may be a pneumatic valve.

The gas line may be a chamber cleaning gas line of a CVD apparatus or a portion thereof.

The gas may be chlorine gas.

The inside of the airtight space may be in a vacuum state.

An inner pressure of the airtight space may be higher than an inner pressure of an upstream line of the main valve and an inner pressure of a downstream line of the second valve.

The internal gas leak inspection device may further include a monitoring device configured to show results obtained by measuring the pressure variation of the airtight space.

The monitoring device may generate an alarm when the pressure variation is a predetermined value or higher.

The internal gas leak inspection device may further include a detector configured to detect elements of gas in the main line.

According to another aspect of the inventive concept, there is provided a method of inspecting an internal leak of gas in a gas line. The method of inspecting an internal leak of gas in a gas line may include steps of providing a main valve and a second valve to the gas line and a pressure gauge sensing an internal pressure of the gas line between the main valve and the second valve and determining whether an internal gas leak occurs, based on a pressure variation sensed by the pressure gauge, when the main valve and the second valve are turned off.

The main valve may be connected to a gas supply and the second valve may be connected to a chamber.

The method of inspecting an internal leak of gas in a gas line may further include a step of providing a positive pressure differential from the gas line between the main valve and the second valve to any other portion of the gas line connected to the main valve or the second valve, or providing a negative pressure differential from the gas line between the main valve and the second valve to any other portion of the gas line connected to the main valve or the second valve.

The method of inspecting an internal leak of gas in a gas line may further include a step of detecting elements of gas in the gas line between the main valve and the second valve.

The method of inspecting an internal leak of gas in a gas line may further include a step of providing a first valve connected to the gas line, wherein the main valve is disposed between the first valve and the second valve.

According to another aspect of the inventive concept, there is provided a method of manufacturing a semiconductor device by using a semiconductor device manufacturing system. The semiconductor device manufacturing system includes a gas line including a first valve and a second valve, a main line interposed between the first valve and the second valve in the gas line, a main valve and a pressure gauge connected to the main line, an airtight space formed in the main line and configured to shield the main valve and the second valve, and a monitoring device configured to measure a pressure variation in the airtight space by using the pressure gauge and to determine whether or not a gas leak occurs based on the measured pressure variation.

The main line may further include a detector configured to detect elements of gas.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
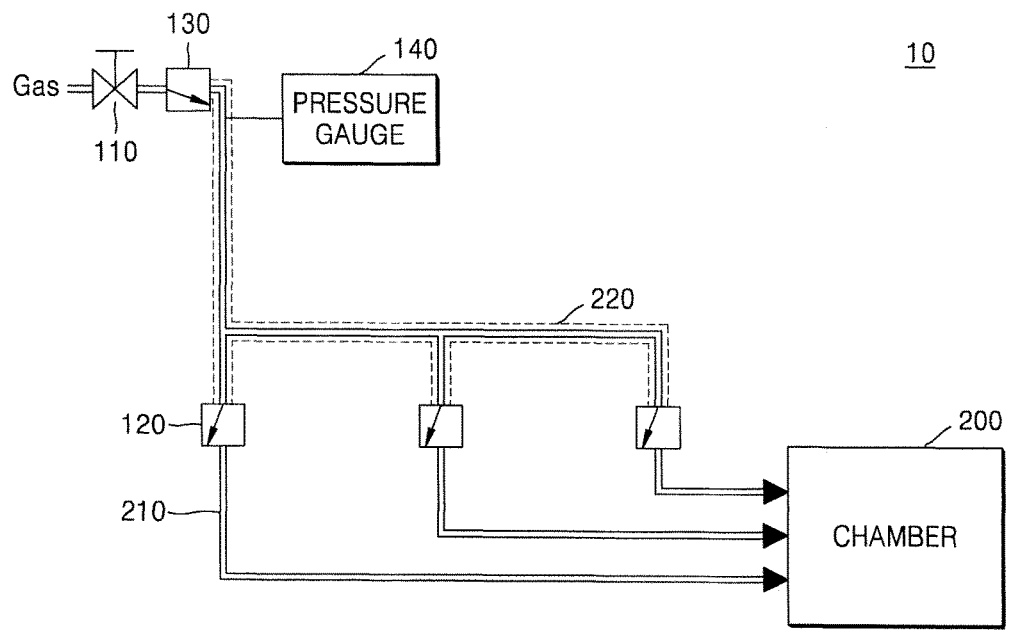
FIG. 1 is a diagram of an LED chip manufacturing system including a main line including a main valve and a pressure gauge used in a method detecting an internal gas leak in a gas line, according to an exemplary embodiment.

As used herein, the term "and/or" includes any and all combinations of one or more of the associated listed items. Expressions such as "at least one of," when preceding a list of elements, modify the entire list of elements and do not modify the individual elements of the list.

The inventive concept will now be described more fully hereinafter with reference to the accompanying drawings, in which exemplary embodiments are shown. This inventive concept may, however, be embodied in different forms and should not be construed as limited to the exemplary embodiments set forth herein. Rather, these embodiments are provided so that this disclosure is thorough and complete and fully conveys the scope of the inventive concept to one of ordinary skill in the art. Like numbers refer to like elements throughout. Furthermore, various elements and regions are schematically illustrated in the drawings. Thus, the inventive concept is not limited by relative sizes or intervals depicted in the drawings.

It will be understood that, although the terms first, second, A, B, etc. may be used herein in reference to elements of the inventive concept, such elements should not be construed as limited by these terms. These terms are only used to distinguish one element from another. For example, a first element could be termed a second element, and a second element could be termed a first element, without departing from the scope of the inventive concept.

The terminology used herein to describe exemplary embodiments is not intended to limit the scope of the inventive concept. The articles "a," "an," and "the" are singular in that they have a single referent, however the use of the singular form in the present document should not preclude the presence of more than one referent. In other words, elements of the inventive concept referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless explicitly so defined herein.

Hereinafter, exemplary embodiments will be described in detail with reference to FIGS. 1 through 18.

FIGS. 1 through 6 are diagrams illustrating a method of inspecting an internal gas leak in a gas line 210, according to exemplary embodiments.

In FIGS. 1 through 4, the gas line 210 is illustrated with a double solid line, and a main line 220 of the gas line 210 is illustrated with a dotted line.

FIG. 1 is a diagram of an LED chip manufacturing system 10 including the main line 220 including a main valve 130 and a pressure gauge 140 used in a method of detecting an internal gas leak in a gas line 210, according to an exemplary embodiment.

Referring to FIG. 1, in a structure of the gas line 210, a first valve 110 may be formed at an upper end of the gas line 210 configured to supply gas to a chamber 200, one main gas line may be separated into several middle lines, and second valves 120 may be respectively formed at the separated middle lines. According to an exemplary embodiment, the main valve 130 may be formed between the first valve 110 and the second valve 120, and the pressure gauge 140 may be formed between the main valve 130 and the second valve 120. For example, the first valve 110 may be a manual valve, and the main valve 130 may be a pneumatic valve.

A method of automatically inspecting an internal gas leak, according to an exemplary embodiment, may include forming an airtight space in the main line 220. The main line 220 may refer to a gas line between the first valve 110 and the second valve 120, and the main valve 130 and the pressure gauge 140 may be formed in the main line 220. By forming the main valve 130, even if a gas leak occurs, the gas leak may be cut off twice by using the main valve 130 and the second valve 120.

A pressure variation in the airtight space may be measured using the pressure gauge 140. The inside of the airtight space may be maintained at a very low pressure (i.e., in a vacuum state) or filled with gas and maintained at a high pressure. When the airtight space is filled with gas, an inner pressure of the airtight space may be higher than an inner pressure of an upstream line of the main valve 130 and an inner pressure of a downstream line of the second valve 120.

A range of the pressure variation may vary according to the length of the main line 220 (i.e., a distance between the main valve 130 and the second valve 120). Accordingly, the range of the pressure variation may be measured using the pressure gauge 140.

It may be determined whether or not a gas leak occurs based on a measurement of the pressure variation. When a pressure variation is maintained in a predetermined value range or higher for a predetermined time or more, it may be determined that an internal gas leak occurs in the gas line 210. When the pressure variation is not maintained for the predetermined time but returns to a normal range, it may be determined that a pressure of only a portion measured by the pressure gauge 140 is instantaneously varied or a malfunction temporarily occurs in the pressure gauge 140. When the airtight space is maintained in a vacuum state and gas internally leaks from the upstream line of the main valve 130 or from the downstream line of the second valve 120 and flows into the main line 220, a pressure of the pressure gauge 140 may become higher than an initial value.

When the airtight space is filled with gas and the inner pressure of the airtight space is higher than the inner pressure of the upstream line of the main valve 130 and the inner pressure of the downstream line of the second valve 120, and when an internal gas leak occurs, a pressure of the pressure gauge 140 may become lower than an initial value due to the flow of gas from the main line 220 into the upstream line of the main valve 130 or into the downstream line of the second valve 120.

When a state, in which a pressure of the pressure gauge 140 becomes higher or lower than the initial value to a predetermined extent or more, is maintained for a predetermined time or more, it may be determined that an internal gas leak occurs.

Here, a case in which an external gas leak due to, for example, a pin hole formed in the main line 220 occurs instead of the internal gas leak may be considered. In this case, an external detector 300 (refer to FIG. 2) capable of detecting an external gas leak may be installed outside the gas line 210 in an LED chip manufacturing system or a semiconductor manufacturing system. When the external detector 300 capable of detecting the external gas leak does not generate any gas leak signal and only a pressure variation is measured by the pressure gauge 140, it may be determined that the internal gas leak occurs.

According to an exemplary embodiment, an example in which gas used for the gas line 210 is chlorine ($Cl_2$) gas for cleaning the chamber 200 will be described. The cleaning of the chamber 200 for preventive maintenance of an LED chip manufacturing system may be closely related to performance of an LED chip. Although the chlorine gas exhibits good cleaning performance, powder may be generated during a reaction of the chlorine gas with hydrogen ($H_2$) gas or ammonia ($NH_3$) gas which may be supplied to the chamber 200 during manufacturing LED chips, and the gas line 210 may be clogged with the powder, thus preventing a smooth flow of gas. Accordingly, in the related art, when occurrence of an internal gas leak is suspected in the gas line 210 to which the chlorine gas is supplied, all valves are disassembled and a leak check is performed on each of the valves. Alternatively, while the chamber 200 of the LED chip manufacturing system was periodically placed in a vacuum state, all valves connected to the inside of the chamber 200 are cut off, and an inner pressure of the chamber 200 is monitored. However, since the method of the related art involves stopping performing processes on the LED chip manufacturing system to check an internal gas leak, a downtime of the LED chip manufacturing system may increase and productivity may be reduced.

To solve these problems, exemplary embodiments provide a method of enabling an operator to check a pressure variation in the gas line 210 using the pressure gauge 140 and determine whether or not an internal gas leak occurs even during an operation of an LED chip manufacturing system. Accordingly, unlike the method of the related art, a downtime of the LED chip manufacturing system may be reduced and an increase in productivity may be expected.

Figure 2:
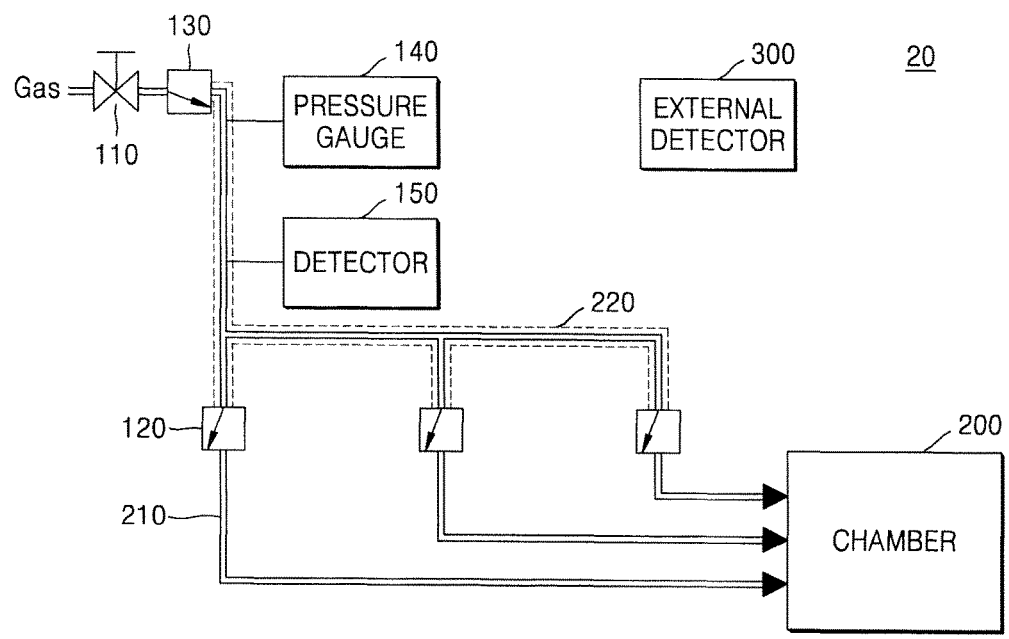
FIG. 2 is a diagram of an LED chip manufacturing system including a main line including a main valve, a pressure gauge, and a detector used in a method of detecting an internal gas leak in a gas line, according to an exemplary embodiment.

FIG. 2 is a diagram of an LED chip manufacturing system 20 including a main line 220 including a main valve 130, a pressure gauge 140, and a detector 150 used in a method of detecting an internal gas leak in a gas line 210, according to an exemplary embodiment.

Referring to FIG. 2, the main line 220 of the gas line 210 may further include the detector 150 configured to detect elements of gas. The detector 150 may detect the components of the gas present in the main line 220. When an airtight space is formed in the main line 220 and gas elements, which are not detected when the main line 220 is made airtight, are detected by the detector 150, it may be determined that an internal gas leak occurs. The detector 150 may detect the remaining small amount of gas flowing from the second valve 120 toward the main line 220 after processes are performed in the chamber 200 of the LED chip manufacturing system. When gas flowing through the main line 220 is mixed with other gases of the gas line 210, the detector 150 may determine that an internal gas leak occurs. The detector 150 may differ from the external detector 300 configured to detect gas leaking out of the gas line 210 (i.e., an external gas leak).

Figure 3:
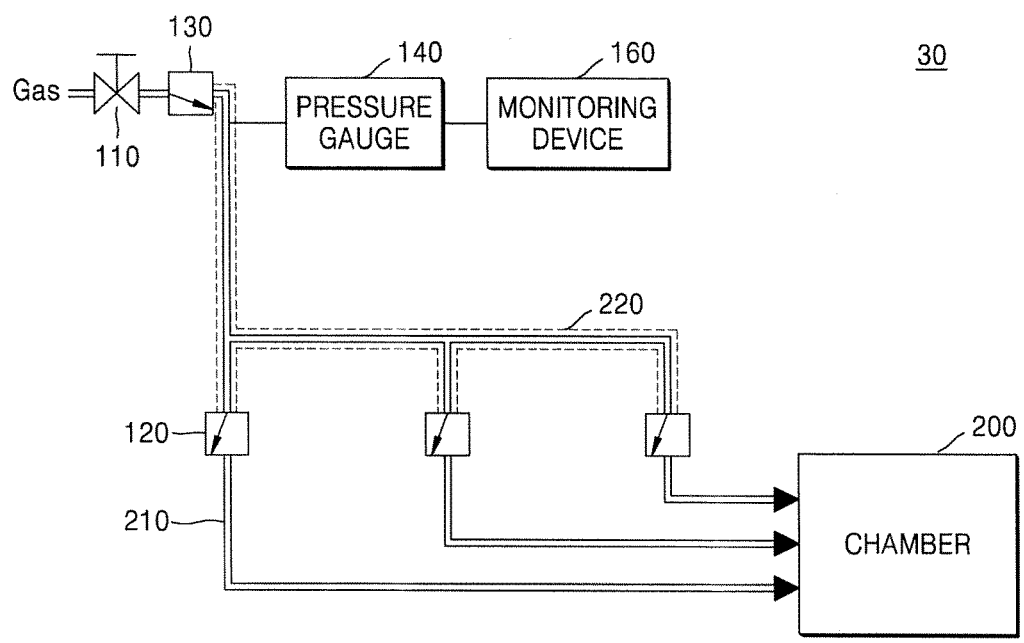
FIG. 3 is a diagram of an LED chip manufacturing system including a main line including a main valve, a pressure gauge, and a monitoring device used in a method of detecting an internal gas leak in a gas line, according to an exemplary embodiment.

FIG. 3 is a diagram of an LED chip manufacturing system 30 including a main line 220 including a main valve 130, a pressure gauge 140, and a monitoring device 160 used in a method of detecting an internal gas leak in a gas line 210, according to an exemplary embodiment.

FIG. 3 illustrates an exemplary embodiment in which the main line 220 of the gas line 210 further includes the main monitoring device 160. The monitoring device 160 may store and analyze data obtained by measuring a pressure variation using the pressure gauge 140. Also, the monitoring device 160 may transmit pressure data to an operator and/or a computer in real-time. When an error in pressure variation occurs, for example, when a state, in which a pressure becomes higher or lower than an initial value to a predetermined extent or more, is maintained for a predetermined time or more, the monitoring device 160 may externally generate an alarm and inform an operator of the error in pressure variation. The alarm may include at least one of an operation of providing an alarm sound through a speaker, an operation of providing a warning message through a screen, and an operation of providing screen flicking. Also, the monitoring device 160 may be connected to an equipment interlock of an LED chip manufacturing system and function to shut down the LED chip manufacturing system when a pressure variation occurs within a large range and may cause malfunctions in the LED chip manufacturing system.

Figure 4:
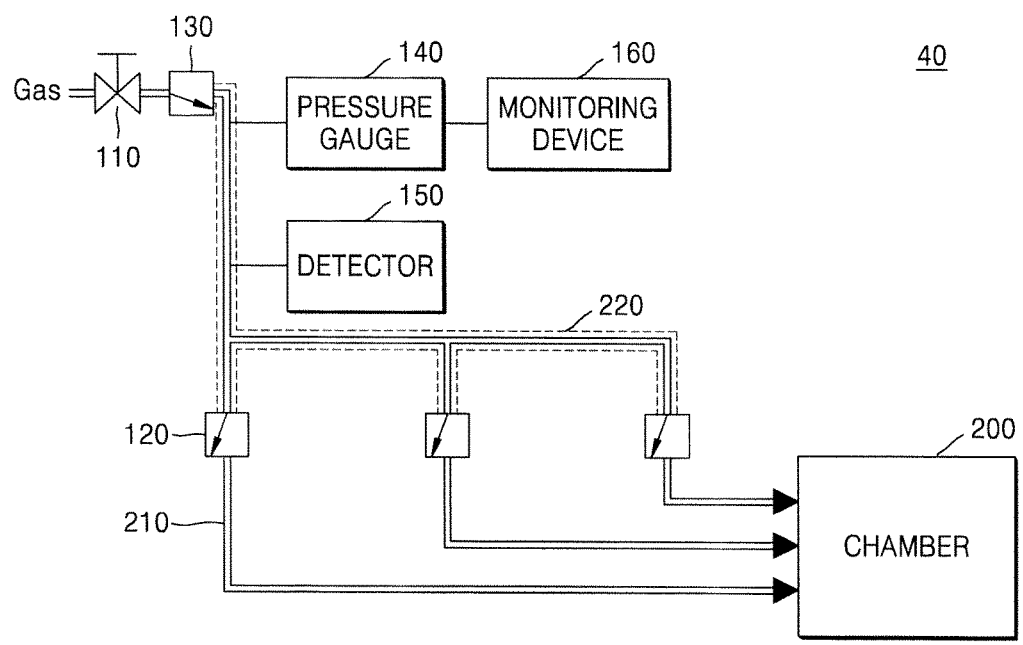
FIG. 4 is a diagram of an LED chip manufacturing system including a main line including a main valve, a pressure gauge, a detector, and a monitoring device used in a method of detecting an internal gas leak in a gas line, according to an exemplary embodiment.

FIG. 4 is a diagram of an LED chip manufacturing system 40 including a main line 220 including a main valve 130, a pressure gauge 140, a detector 150, and a monitoring device 160 used in a method of detecting an internal gas leak in a gas line 210, according to an exemplary embodiment.

Referring to FIG. 4, the main line 220 of the gas line 210 may further include the detector 150 and the monitoring device 160. Descriptions of the detector 150 and the monitoring device 160 are the same as described above.

Figure 5:
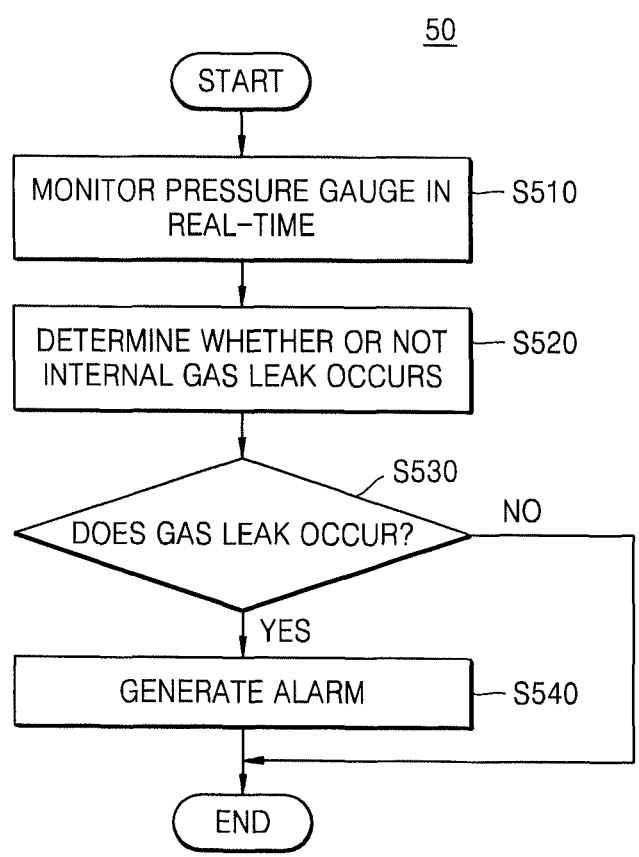
FIG. 5 is a flowchart of a process of sensing an internal gas leak and generating an alarm using a monitoring device in a gas line, according to an exemplary embodiment.

FIG. 5 is a flowchart 50 of a process of sensing an internal gas leak and generating an alarm using the monitoring device 160 in the gas line 210, according to the exemplary embodiment.

Referring to FIGS. 4 and 5, in operation S510, an airtight state of the gas line 210 (i.e., an internal gas leak) may be monitored in real-time using the pressure gauge 140 included in the main line 220 of the gas line 210. In operation S520, the monitoring device 160 may receive detected information from the pressure gauge 140 and determine whether a gas leak occurs in the gas line 210. In operation S530, it may be determined whether the gas leak occurs based on a measurement of pressure variation. When the pressure variation remains equal to or higher than a predetermined value for a predetermined time or more, it may be determined that an internal gas leak occurs in the gas line 210. When the pressure variation does not remain for a predetermined time but returns to a normal range, it may be determined that a pressure of only a portion measured by the pressure gauge 140 is instantaneously varied or a malfunction temporarily occurs in the pressure gauge 140. When it is finally determined that a gas leak occurs in the gas line 210, an alarm to inform an operator of the gas leak may be externally generated in operation S540.

Figure 6:
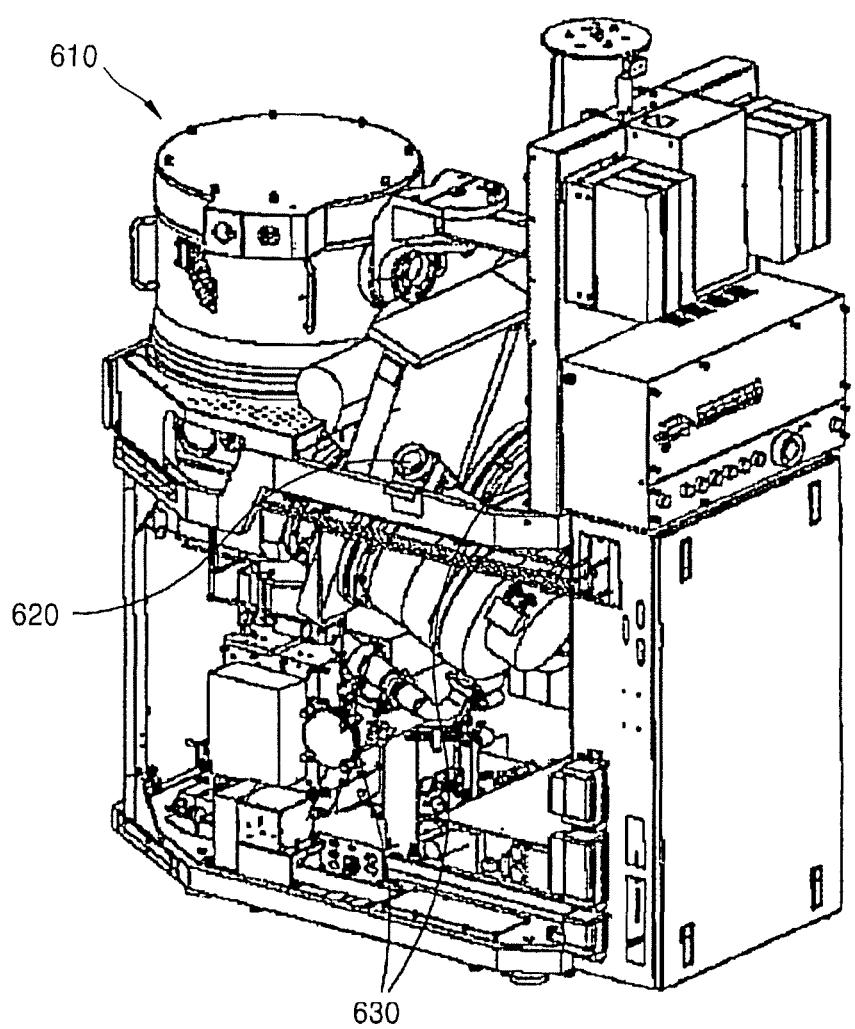
FIG. 6 is a perspective view of some components of a chemical vapor deposition (CVD) apparatus of a light-emitting diode (LED) chip manufacturing system, according to an exemplary embodiment.

FIG. 6 is a perspective view of some components 60 of a chemical vapor deposition (CVD) apparatus of an LED chip manufacturing system, according to an exemplary embodiment. In the present exemplary embodiment, a CVD apparatus of the LED chip manufacturing system will be described as an example.

FIG. 6 illustrates some components 60 of the CVD apparatus of the LED chip manufacturing system and schematically illustrates a position of a chamber 610 including an internal gas leak inspection device.

Although not shown in FIG. 6, in the internal gas leak inspection device of the LED chip manufacturing system, the main line 220 of the gas line 210 may include a main valve, a pressure gauge, a monitoring device, and a detector. The internal gas leak inspection device may monitor a gas leak in the gas line 210 in real-time, and the monitoring device may determine whether or not an internal gas leak occurs, and generate an alarm to inform an operator of the gas leak.

According to gas leak inspection methods of the related art, all valves are disassembled and a leak check is performed on each of the valves. Alternatively, while the inside of the chamber 610 is periodically placed in a vacuum state, all values connected to the inside of the chamber 610 are cut off, and an inner pressure of the chamber 610 is monitored. These gas leak inspection methods of the related art lead to a reduction in yield, an increase in damage to LED chips, and a drop in rate of operation of equipment, thereby reducing productivity. Therefore, according to a method of detecting an internal gas leak in the gas line 210, according to an exemplary embodiment, the internal gas leak may be detected in real-time, and a time taken for preventive maintenance may be reduced.

To clean the chamber 610 of the CVD apparatus, the gas line 210 may be connected to the chamber 610. The chamber 610 of the CVD apparatus may include, for example, a process chamber, a transfer chamber, and/or a loadlock chamber. Also, peripheral devices, such as an emergency power-off (EPO) button 620 and a turbo pump 630, may be provided on one side of the chamber 610. Furthermore, the CVD apparatus may include a controller to control general operations of the CVD apparatus.

The detector may be, for example, a gas sensor. The detector may be provided in the main line 220 connected to the gas line 210, detect whether or not a specific gas leaks from the gas line 210 in real-time, and provide detected information. Also, the detector may be designed to sense elements of the specific gas, such as chlorine gas. Various gas elements, for example, helium gas and nitrogen gas, may be sensed to adjust to required conditions.

Also, the monitoring device may receive the detected information from the pressure gauge and/or the detector and monitor a state of the gas line 210. When an internal gas of the specific gas occurs in the gas line 210 during a monitoring process, the monitoring device may externally generate an alarm to inform an operator of the gas leak.

As described above, to perform a method of sensing a gas leak, according to an exemplary embodiment, in a CVD apparatus including a plurality of gas lines 210, a detector configured to detect a specific element may be installed in a main line 220 of each of the gas lines 210. For example, when helium (He) gas is intended to be detected, a detector capable of detecting only He gas may be installed in the main line 220. Alternatively, when nitrogen ($N_2$) gas is intended to be detected, a detector capable of detecting only $N_2$ gas may be installed in the main line 220 and detect a state of an internal gas leak in the gas line 210 in real-time.

Since the method of manufacturing the LED chip, according to the above-described exemplary embodiments, is similar to a semiconductor device manufacturing process, it will be understood by one of ordinary skill in the art that the above-described exemplary embodiments may be applied to a method of manufacturing a semiconductor device, and descriptions of the method of manufacturing the semiconductor device will be omitted.

FIGS. 7 through 19 are diagrams of LED chips manufactured using a method of manufacturing an LED chip, according to various exemplary embodiments.

Figure 7:
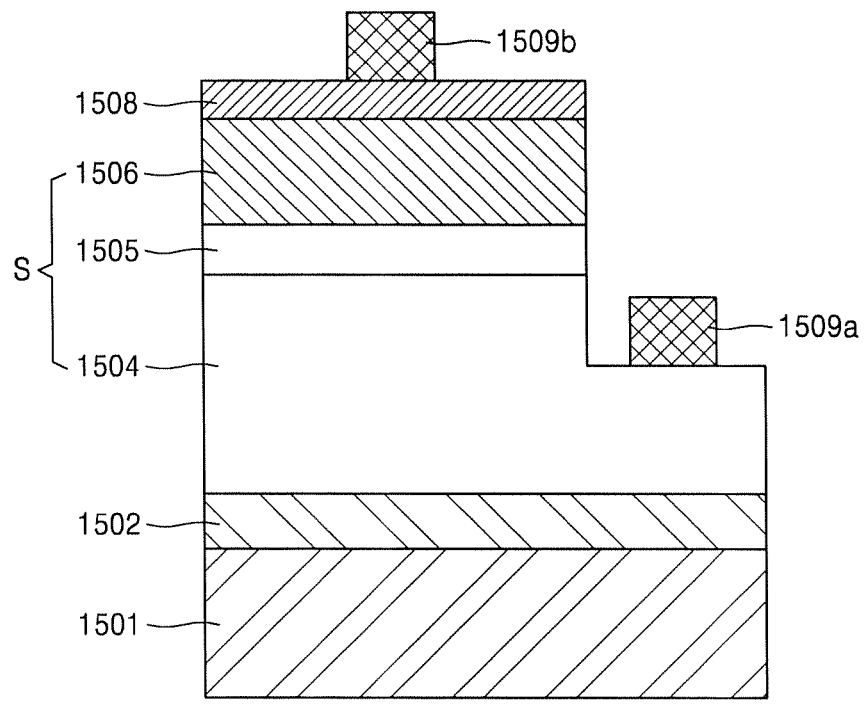
FIG. 7 is a side cross-sectional view of an example of an LED chip manufactured using a method of manufacturing an LED chip, according to an exemplary embodiment.

FIG. 7 is a side cross-sectional view of an example of an LED chip 1500 manufactured using a method of manufacturing an LED chip, according to an exemplary embodiment. As shown in FIG. 7, the chip 1500 may include a light-emitting stack structure S formed on a semiconductor substrate 1501. The light-emitting stack structure S may include a first-conductivity-type semiconductor layer 1504, an active layer 1505, and a second-conductivity-type semiconductor layer 1506.

Also, the chip 1500 may include an ohmic contact layer 1508 formed on the second-conductivity-type semiconductor layer 1506, and first and second electrodes 1509a and 1509b may be respectively formed on top surfaces of the first-conductivity-type semiconductor layer 1504 and the ohmic contact layer 1508.

It will be understood that spatially relative terms, such as "upper", "top surface", "lower", "bottom surface", "side surface" and the like, are intended to encompass different orientations of the device in use or operation in addition to the orientation depicted in the figures.

Hereinafter, main components of the LED chip 1500 will be described in further detail.

An insulating substrate, a conductive substrate, or a semiconductor substrate may be used as the substrate 1501 as needed. For example, the substrate 1501 may be a substrate formed of sapphire, SiC, Si, $MgAl_2O_4$, MgO, $LiAlO_2$, $LiGaO_2$, or GaN. A sapphire substrate, a silicon carbide (SiC) substrate, or a silicon (Si) substrate may be mainly used as a hetero substrate. When the hetero substrate is used, defects, such as dislocation, may increase due to lattice mismatch between a substrate material and a thin-film material. Furthermore, when temperature varies, warpage may occur due to different thermal expansion between the substrate material and the thin-film material, and may result in occurrence of cracks in a thin layer. These problems may be reduced using a buffer layer 1502 formed between the substrate 1501 and a GaN-based light-emitting stack structure S.

The buffer layer 1502 may be formed of $Al_xIn_yGa_{(1-x-y)}N$ ($0 \le x \le 1$, $0 \le y \le 1$). In particular, the buffer layer 1502 may be formed of GaN, AlN, AlGaN, InGaN, or InGaNAlN. Also, the buffer layer 1502 may be formed of a material such as $ZrB_2$, $HfB_2$, ZrN, HfN, or TiN as needed. Furthermore, the buffer layer 1502 may be formed by combining a plurality of layers or gradually varying compositions.

Meanwhile, each of the first and second-conductivity-type semiconductor layers 1504 and 1506 may have a single-layered structure. However, in other cases, each of the first and second-conductivity-type semiconductor layers 1504 and 1506 may have a multilayered structure including layers having different compositions or thicknesses. For example, each of the first and second-conductivity-type semiconductor layers 1504 and 1506 may include a carrier injection layer capable of improving efficiency of injection of electrons and holes, and have a variously shaped superlattice structure.

The first-conductivity-type semiconductor layer 1504 may further include a current diffusion layer (not shown) disposed in a portion adjacent to the active layer 1505. The current diffusion layer may have a structure in which a plurality of $In_xAl_yGa_{(1-x-y)}N$ layers having different compositions or different dopant contents are repetitively stacked, or may partially include an insulating material layer.

The second-conductivity-type semiconductor layer 1506 may further include an electron blocking layer (not shown) disposed in a portion adjacent to the active layer 1505. The electron blocking layer may include a structure in which a plurality of layers formed of $In_xAl_yGa_{(1-x-y)}N$ having different compositions are stacked, or at least one layer formed of $Al_yGa_{(1-y)}N$. The electron blocking layer may have a higher bandgap than the active layer 1505 and prevent electrons from being transported to the second-conductivity-type (p-type) semiconductor layer 1506.

The light-emitting stack structure S may be performed using a metal organic CVD (MOCVD) apparatus using a method of sensing an internal gas leak according to an exemplary embodiment. The manufacture of the light-emitting stack structure S may include supplying an organic metal compound gas (e.g., trimethyl gallium (TMG) or trimethyl aluminium (TMA)) and a nitrogen-containing gas (e.g., ammonia gas) as reactive gases into a reaction container into which a substrate 1501 is loaded, maintaining the substrate 1501 at a high temperature of about 900° C. to about 1100° C., and stacking a GaN-based compound semiconductor as an undoped type, an n type, or a p type by supplying a dopant gas as needed while growing the GaN-based compound semiconductor on the substrate 1501. Silicon may be known as an n-type dopant, and a p-type dopant may be zinc (Zn), cadmium (Cd), beryllium (Be), magnesium (Mg), cadmium (Ca), or barium (Ba). Among these, Mg or Zn may be typically used as the p-type dopant.

Also, the active layer 1505 interposed between the first and second-conductivity-type semiconductor layers 1504 and 1506 may have a multiple quantum well (MQW) structure in which a quantum well layer and a quantum barrier layer are alternately stacked. For example, when the active layer 1505 is formed of a nitride semiconductor, a GaN/InGaN structure may be used. However, the active layer 1505 may have a single quantum well (SQW) structure.

The ohmic contact layer 1508 may relatively increase a dopant concentration, lower an ohmic contact resistance, reduce an operating voltage of a device, and improve device characteristics. The ohmic contact layer 1508 may be formed of GaN, InGaN, or ZnO or include a graphene layer.

The first electrode 1509a or the second electrode 1509b may include a material, such as silver (Ag), nickel (Ni), aluminium (Al), rhodium (Rh), palladium (Pd), iridium (Ir), ruthenium (Ru), magnesium (Mg), zinc (Zn), platinum (Pt), or gold (Au), or have a structure including at least two layers, such as Ni/Ag, Zn/Ag, Ni/Al, Zn/Al, Pd/Ag, Pd/Al, Ir/Ag. Ir/Au, Pt/Ag, Pt/Al, or Ni/Ag/Pt.

Although the LED chip shown in FIG. 7 has a structure in which the first and second electrodes 1509a and 1509b face the same surface as a light extraction surface, the LED chip may have various structures, such as a flip-chip structure in which first and second electrodes face in an opposite direction to a light extraction surface, a vertical structure in which first and second electrodes are formed on opposite surfaces to each other, or a vertical-horizontal structure adopting an electrode structure in which several vias are formed in a chip to increase current spreading efficiency and radiation efficiency.

Figure 8:
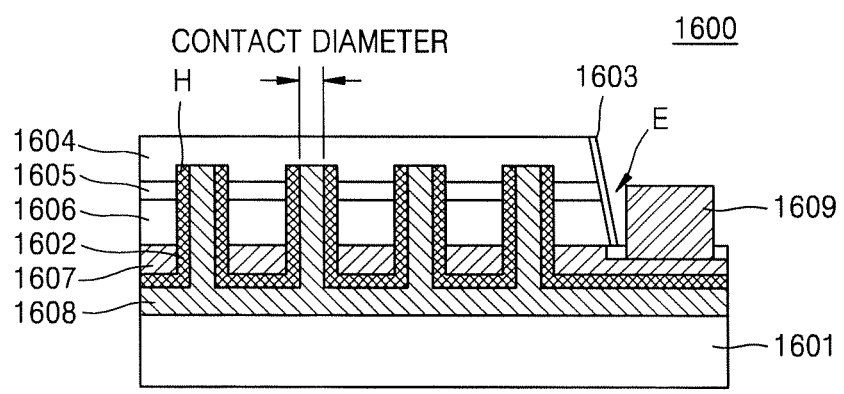
FIG. 8 is a side cross-sectional view of another example of an LED chip manufactured using a method of manufacturing an LED chip, according to an exemplary embodiment.

FIG. 8 is a side cross-sectional view of another example of an LED chip 1600 manufactured using a method of manufacturing an LED chip, according to an exemplary embodiment. When a large-area high-output LED chip for illumination is manufactured, the LED chip 1600 shown in FIG. 8 may be used as a structure for increasing current spreading efficiency and radiation efficiency.

As shown in FIG. 8, the LED chip 1600 may include a first-conductivity-type semiconductor layer 1604, an active layer 1605, a second-conductivity-type semiconductor layer 1606, a second electrode layer 1607, an insulating layer 1602, a first electrode layer 1608, and a substrate 1601, which may be stacked sequentially. In this case, the first electrode layer 1608 may include at least one contact hole H, which may be electrically insulated from the second-conductivity-type semiconductor layer 1606 and the active layer 1605 and extend from one surface of the first electrode layer 1608 to at least a partial region of the first-conductivity-type semiconductor layer 1604, so that the first electrode layer 1608 can be electrically connected to the first-conductivity-type semiconductor layer 1604. The first electrode layer 1608 is not necessarily required in the present exemplary embodiment.

The contact hole H may extend from an interface between the first electrode layer 1608 and the second electrode layer 1607 through the second electrode layer 1607, the second-conductivity-type semiconductor layer 1606, and the active layer 1605 into the first-conductivity-type semiconductor layer 1604. The contact hole H may extend to at least an interface between the active layer 1605 and the first-conductivity-type semiconductor layer 1604. For example, the contact hole H may extend to a portion of the first-conductivity-type semiconductor layer 1604. However, since the contact hole H is provided for electrical connection of the first-conductivity-type semiconductor layer 1604 and current spreading and desired effects may be achieved only by bringing the contact hole H into contact with the first-conductivity-type semiconductor layer 1604, the contact hole H may not need to extend to an outer surface of the first-conductivity-type semiconductor layer 1604.

The second electrode layer 1607 formed on the second-conductivity-type semiconductor layer 1606 may be formed of one selected from among Ag, Ni, Al, Rh, Pd, Ir, Ru, Mg, Zn, Pt, or Au in consideration of a light reflection function and a function of ohmic contact with the second-conductivity-type semiconductor layer 1606. The second electrode layer 1607 may be formed using a sputtering process or a deposition process.

The contact hole H may penetrate through the second electrode layer 1607, the second-conductivity-type semiconductor layer 1606, and the active layer 1605 so that the contact hole H may be connected to the first-conductivity-type semiconductor layer 1604. The contact hole H may be formed using an etching process, for example, an inductively coupled plasma-reactive ion etching (ICP-RIE) process.

The insulating layer 1602 may be formed to cover a sidewall of the contact hole H and a surface of the second-conductivity-type semiconductor layer 1606. In this case, at least a portion of the first-conductivity-type semiconductor layer 1604 corresponding to a bottom surface of the contact hole H may be exposed. The insulating layer 1602 may be formed by depositing an insulating material, such as $SiO_2$, $SiO_xN_y$, or $Si_xN_y$.

The second electrode layer 1608 including a conductive via formed by filling a conductive material may be formed within the contact hole H. Thereafter, the substrate 1601 may be formed on the second electrode layer 1608. In the resultant structure, the substrate 1601 may be electrically connected to the first-conductivity-type semiconductor layer 1604 by the conductive via.

The substrate 1601 may be formed of, but is not limited to, a material containing any one of Au, Ni, Al, Cu, W, Si, Se, GaAs, SiAl, Ge, SiC, AlN, $Al_2O_3$, GaN, and AlGaN. The substrate 1601 may be formed using a plating process, a sputtering process, a deposition process, or a bonding process.

The number, shape, and pitch of contact holes H and contact areas between the contact holes H and the first- and second-conductivity-type semiconductor layers 1604 and 1606 may be appropriately controlled to reduce a contact resistance. Also, the contact holes H may be arranged in various shapes in rows and columns to improve the flow of current. The number of a plurality of conductive vias arranged in rows and columns and contact areas between the conductive vias and the first-conductivity-type semiconductor layer 1604 may be controlled such that an area occupied by the conductive vias on a plane surface of a region in which the conductive vias contact the first-conductivity-type semiconductor layer 1604 ranges from about 1% to 5% of an area of a plane surface of a light-emitting stack structure. For example, the diameter of the conductive vias in the region in which the conductive vias contact the first-conductivity-type semiconductor layer 1604 may range from about 5 μm to about 50 μm, and the number of the conductive vias may range from about 1 to 50 in a region of the light-emitting stack structure according to the width of the region of the light-emitting stack structure. Although depending on the width of the region of the light-emitting stack structure, at least two conductive vias may be formed and have a matrix structure in which the conductive vias are arranged in rows and columns apart from one another by a distance ranging from about 100 µm to about 500 µm, preferably, about 150 µm to about 450 µm. When a distance between the conductive vias is less than about 100 µm, the number of the conductive vias may increase, and an emission area may be reduced to reduce luminous efficiency. When a distance between the conductive vias is larger than about 500 µm, current spreading may be precluded to reduce luminous efficiency. The conductive vias may be formed to a different depth according to the thicknesses of the second-conductivity-type semiconductor layer 1606 and the active layer 1605. For example, the conductive vias may be formed to a depth of, for example, about 0.5 µm to about 5.0 µm.

Although an LED illumination system provides improved radiation characteristics, an LED chip having a small amount of heat generated may be adopted for the LED illumination system in terms of overall radiation performance. As an LED chip that satisfies the above-described requirements, an LED chip including a nano structure (hereinafter, "nano LED chip") may be used.

Recently, a core-shell-type nano LED chip has been developed as the nano LED chip. In particular, since the nano LED chip has a low joint density, a relatively small amount of heat may be generated. Also, the nano LED chip may use a nano structure and increase an emission area to elevate luminous efficiency. Also, since degradation of efficiency due to polarization may be prevented by forming a nonpolar active layer, droop characteristics may be enhanced.

Figure 9:
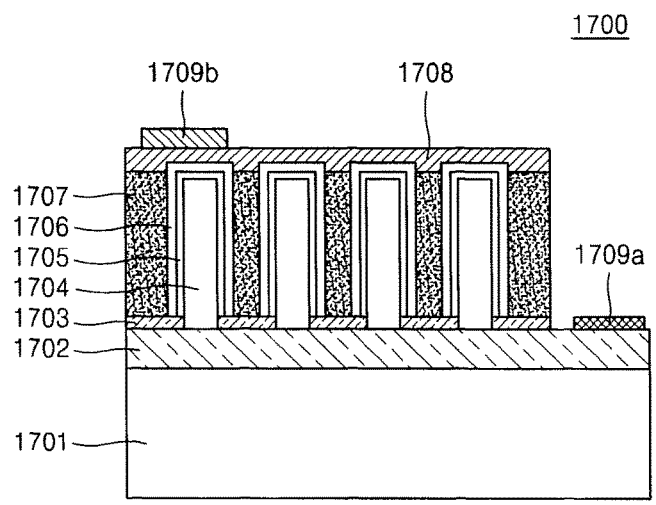
FIG. 9 is a side cross-sectional view of another example of an LED chip manufactured using a method of manufacturing an LED chip, according to an exemplary embodiment.

FIG. 9 is a side cross-sectional view of another example of an LED chip manufactured using a method of manufacturing an LED chip, according to an exemplary embodiment. As shown in FIG. 9, a nano LED chip 1700 may include a plurality of nano light-emitting structures N formed on a substrate 1701. Although the present exemplary embodiment describes an example in which each of the nano light-emitting structures N is a load structure as a core-shell structure, the present exemplary embodiment is not limited thereto and each of the nano light-emitting structures N may have another structure, such as a pyramidal structure.

The nano LED chip 1700 may include a base layer 1702 formed on the substrate 1701. The base layer 1702 may provide a surface on which the nano light-emitting structures N are grown. The base layer 1702 may be a first-conductivity-type semiconductor layer. A mask layer 1703 having an open region for growing the nano light-emitting structure N (particularly, a core) may be formed on the base layer 1702. The mask layer 1703 may include a dielectric material, such as $SiO_2$ or $SiN_x$.

The formation of the nano light-emitting structure N may include forming a first-conductivity-type nanocore 1704 by selectively growing a first-conductivity-type semiconductor using the mask layer 1703 having the open region and forming an active layer 1705 and a second-conductivity-type semiconductor layer 1706 as a shell layer on the surface of the nanocore 1704. Thus, the nano light-emitting structure N may have a core-shell structure in which the first-conductivity-type semiconductor serves as a nanocore and the active layer 1705 and the second-conductivity-type semiconductor layer 1706 serve as a shell layer to surround the nanocore.

The nano LED chip 1700, according to the exemplary embodiment, may include a filling material 1707 filled between the nano light-emitting structures N. The filling material 1707 may structurally stabilize the nano light-emitting structure N. The filling material 1707 may be formed of, but is not limited thereto, a transparent material such as $SiO_2$. An ohmic contact layer 1708 may be formed on the nano light-emitting structure N and connected to the second-conductivity-type semiconductor layer 1706. The nano LED chip 1700 may include the base layer 1702 formed of a first-conductivity-type semiconductor and first and second electrodes 1709a and 1709b, each of which is connected to the ohmic contact layer 1708.

Light having at least two different wavelengths may be emitted from a single device by varying the diameter, elements, or dopant concentration of the nano light-emitting structure N. The single device may embody white light without using phosphor by appropriately controlling light having different wavelengths. Also, the single device may be combined with another LED chip or a wavelength conversion material, such as phosphor, thereby embodying light in desired various colors or white light having a different color temperature.

Figure 10:
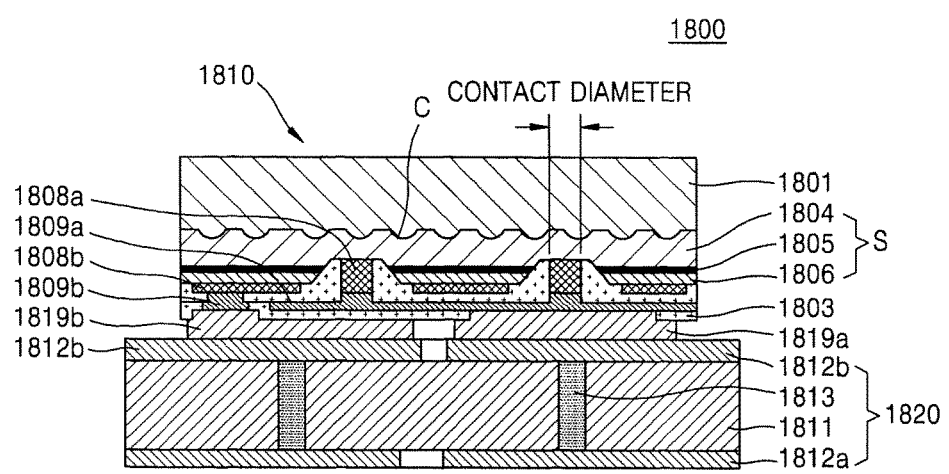
FIG. 10 is a side cross-sectional view of an example of a light-emitting device including an LED chip that is manufactured using a method of manufacturing an LED chip, according to an exemplary embodiment and is mounted on a substrate.

FIG. 10 is a side cross-sectional view of an example of a light-emitting device including an LED chip that is manufactured using a method of manufacturing an LED chip, according to an exemplary embodiment, and is mounted on a substrate. A semiconductor light-emitting device 1800 shown in FIG. 10 may include a mounting substrate 1820 and an LED chip 1810 mounted on the mounting substrate 1820. The LED chip 1810 may be different from the above-described examples of LED chips.

The LED chip 1810 may include a light-emitting stack structure S disposed on one surface of a substrate 1801, and first and second electrodes 1808a and 1808b disposed opposite the substrate 1801 across the light-emitting stack structure S. Also, the LED chip 1810 may include an insulating unit 1803 formed to cover the first and second electrodes 1808a and 1808b.

The first and second electrodes 1808a and 1808b may include first and second electrode pads 1819a and 1819b due to first and second electrical connection units 1809a and 1809b.

The light-emitting stack structure S may include a first-conductivity-type semiconductor layer 1804, an active layer 1805, and a second-conductivity-type semiconductor layer 1806, which may be sequentially disposed on the substrate 1801. The first electrode 1808a may be provided as a conductive via, which may be formed through the second-conductivity-type semiconductor layer 1806 and the active layer 1805 and connected to the first-conductivity-type semiconductor layer 1804. The second electrode 1808b may be connected to the second-conductivity-type semiconductor layer 1806.

The insulating unit 1803 may include an open region to expose at least a portion of the first and second electrodes 1808a and 1808b, the first and second electrode pads 1819a and 1819b may be connected to the first and second electrodes 1808a and 1808b, respectively.

The first and second electrodes 1808a and 1808b may have a single layer or multilayered structure formed of a conductive material having ohmic characteristics with the first and second-conductivity-type semiconductor layers 1804 and 1806. For example, each of the first and second electrodes 1808a and 1808b may be formed by depositing or sputtering at least one of a material such as Ag, Al, Ni, Cr, and a transparent conductive oxide (TCO). The first and second electrodes 1808a and 1808b may be disposed in the same direction, and mounted as a flip-chip type on a lead frame as described below. In this case, the first and second electrodes 1808a and 1808b may be disposed in the same direction.

In particular, the first electrical connection unit 1809a may be formed by the first electrode 1808a having a conductive via, which may be formed through the first-conductivity-type semiconductor layer 1804 and the active layer 1805 and connected to the first-conductivity-type semiconductor layer 1804 in the light-emitting stack structure S.

The numbers, shapes, and pitches of the conductive vias and the first electrical connection units 1809a and contact areas between the conductive vias and the first electrical connection units 1809a and the first-conductivity-type semiconductor layer 1804 may be appropriately controlled to reduce a contact resistance. The conductive vias and the first electrical connection units 1809a may be arranged in rows and columns to improve the flow of current. The conductive vias may be arranged in rows and columns in the same manner as described with reference to FIG. 8.

Another electrode structure may include the second electrode 1808b directly formed on the second-conductivity-type semiconductor layer 1806 and the second electrical connection unit 1809b formed on the second electrode 1808b. The second electrode 1808b may function to form an electrical ohmic contact with the second-conductivity-type semiconductor layer 23. In addition, the second electrode 1808b may be formed of a light reflection material and effectively emit light emitted by the active layer 1805, toward the substrate 1801 while mounting the LED chip 1810 as a flip-chip structure. The second electrode 1808b may be formed of a light-transmissive conductive material, such as TCO, along a main light emission direction.

The above-described two electrode structures may be electrically isolated from each other by the insulating unit 1803. The insulating unit 1803 may be formed of any material having insulating characteristics, or any object having insulating characteristics may be used as the insulating unit 1803. The insulating unit 1803 may be formed of a material having a low absorption rate. For example, the insulating unit 1803 may be formed of silicon oxide or silicon nitride, such as $SiO_2$, $SiO_xN_y$, or $Si_xN_y$. When necessary, a light-reflective structure may be formed by dispersing a light reflective filler in a light-transmissive material.

The first and second electrode pads 1819a and 1819b may be respectively connected to the first and second electrical connection units 1809a and 1809b and function as external terminals of the LED chip 1810. For example, the first and second electrode pads 1819a and 1819b may be formed of gold (Au), silver (Ag), aluminium (Al), titanium (Ti), tungsten (W), copper (Cu), tin (Sn), nickel (Ni), platinum (Pt), chromium (Cr), NiSn, TiW, AuSn, or a eutectic metal thereof. In this case, when the first and second electrode pads 1819a and 1819b are mounted on the mounting substrate 1820, the first and second electrode pads 1819a and 1819b may be bonded to the mounting substrate 1820 using a eutectic metal, so additional solder bumps, which are typically required for a flip-chip bonding process, may not be used. A mounting method using a eutectic metal may produce better radiation effects than a mounting method using solder bumps. In this case, the first and second electrode pads 1819a and 1819b may be formed to occupy large areas to achieve excellent radiation effects.

Unless expressly described otherwise, the substrate 1801 and the light-emitting stack structure S may be understood with reference to the descriptions of FIG. 7. Although not specifically shown, a buffer layer (not shown) may be formed between the light-emitting stack structure S and the substrate 1801. An undoped semiconductor layer formed of nitride may be adopted as the buffer layer to reduce lattice defects of a light-emitting structure grown on the buffer layer.

The substrate 1801 may have first and second main surfaces disposed opposite each other, and a rough structure may be formed on at least one of the first and second main surfaces of the substrate 1801. The rough structure formed on at least one of the first and second main surfaces of the substrate 1801 may be formed by etching a portion of the substrate 1801 and include the same material as the substrate 1801. Alternatively, the rough structure may be formed of a material different from the substrate 1801.

As in the present exemplary embodiment, when the rough structure may be formed at an interface between the substrate 1801 and the first-conductivity-type semiconductor layer 1804, light emitted by the active layer 1805 may travel along various paths. Therefore, a rate of absorption of light into the semiconductor layer may be reduced, and a light scattering rate may increase, thereby increasing light extraction efficiency.

Specifically, the rough structure may have a regular shape or an irregular shape. A transparent conductor, a transparent insulator, or a highly reflective material may be used as a hetero material forming a rough portion. The transparent insulator may be $SiO_2$, $SiN_x$, $Al_2O_3$, hafnium oxide (HfO), titanium oxide ($TiO_2$), or zirconium oxide (ZrO), the transparent conductor may be a TCO, such as ZnO or indium oxide containing an additive (e.g., Mg, Ag, Zn, scandium (Sc), hafnium (Hf), zirconium (Zr), tellurium (Te), selenium (Se), tantalum (Ta), W, niobium (Nb), copper (Cu), Si, Ni, Co, Mo, Cr, or Sn), and the reflective material may be Ag, Al, or a multilayered structure having different refractive indices, but the inventive concept is not limited thereto.

The substrate 1801 may be removed from the first-conductivity-type semiconductor layer 1804. The removal of the substrate 1801 may be performed using a laser lift-off (LLO) process using a laser, an etching process, or a polishing process. Also, after removing the substrate 1801, a rough portion may be formed on the surface of the first-conductivity-type semiconductor layer 1804.

As shown in FIG. 10, the LED chip 1810 may be mounted on a mounting substrate 1820. The mounting substrate 1820 may include upper and lower electrode layers 1812b and 1812a respectively formed on top and bottom surfaces of a substrate main body 1811 and a via 1813 formed through the substrate main body 1811 to connect the upper and lower electrode layers 1812b and 1812a to each other. The substrate main body 1811 may be formed of a resin, ceramic, or a metal, and the upper electrode layer 1812b or the lower electrode layer 1812a may be a metal layer formed of Au, Cu, Ag, or Al.

A substrate on which the above-described LED chip 1810 is mounted is not limited to the shape of the mounting substrate 1820 shown in FIG. 10 and may be any substrate on which an interconnection structure for driving the LED chip 1810 is formed. For example, a package structure in which an LED chip is mounted on a package main body having a pair of lead frames may be provided.

In addition to the above-described LED chip, LED chips having various structures may be used. For example, an LED chip in which surface-plasmon polaritons (SPPs) are formed at an interface between a metal and a dielectric material and made to interact with quantum well excitons to greatly improve light extraction efficiency may be effectively employed.

An LED chip having various shapes may be mounted on a circuit substrate and used as a bare chip for the above-described light-emitting device or may be used as a package structure having various shapes, which may be mounted on a package main body having a pair of electrode structures.

A package including the LED chip (hereinafter, a light-emitting device package) may provide an external terminal structure, which may be easily connected to an external circuit, and have a radiation structure for improving radiation characteristics of the LED chip and various optical structures for improving optical characteristics. For instance, the various optical structures may include a wavelength conversion unit configured to convert light emitted by the LED chip into light having another wavelength or a lens structure for improving light distribution characteristics.

An LED chip package having a chip-scale package (CSP) structure may be used as an example of a light-emitting device package that may be applied to the above-described illumination system.

A CSP may be appropriate for mass production because the CSP may reduce the size of the LED chip package and simplify a manufacturing process. In particular, a CSP may be effectively used for an illumination system because a wavelength conversion material such as phosphor and an optical structure such as a lens may be integrally manufactured along with an LED chip.

Figure 11:
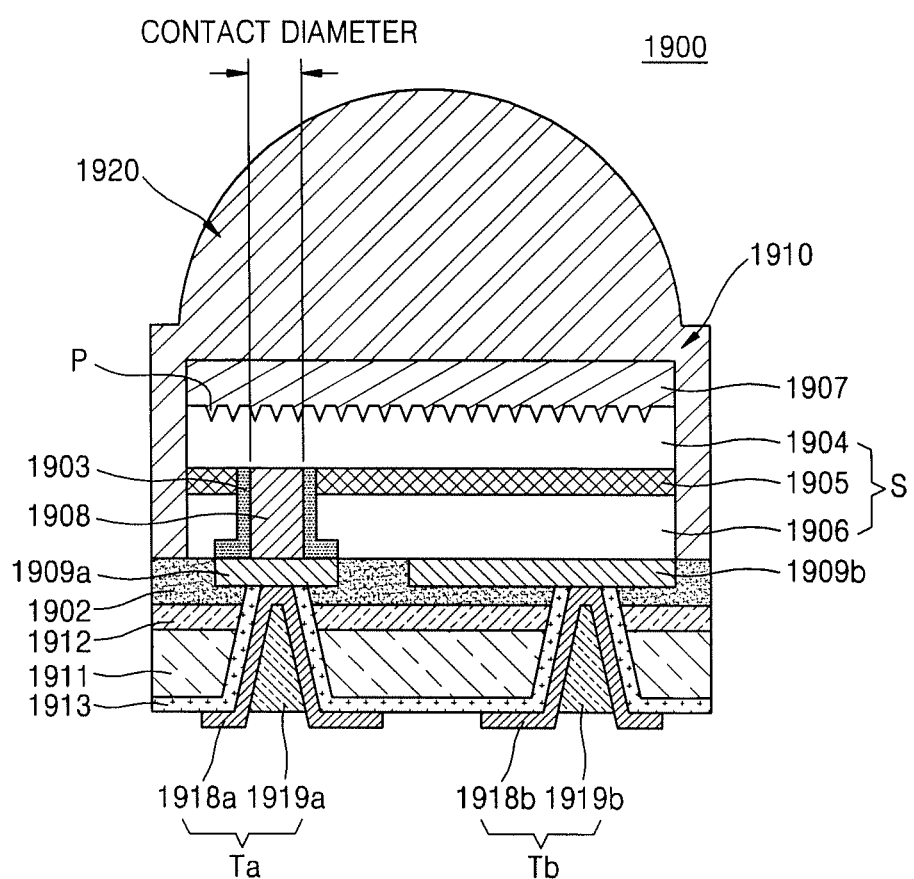
FIG. 11 is a side cross-sectional view of an example of a light-emitting device package applicable to a light-emitting device array in which an LED chip manufactured using a method of manufacturing an LED chip, according to an exemplary embodiment is arranged.

FIG. 11 is a side cross-sectional view of an example of a light-emitting device package applicable to a light-emitting device array in which an LED chip manufactured using a method of manufacturing an LED chip, according to an exemplary embodiment, is arranged. In a package structure shown in FIG. 11 as an example of a CSP, an electrode may be formed on a bottom surface of a light-emitting device 1910, which is opposite to a main light extraction surface, and a phosphor layer 1907 and a lens 1920 may be integrally formed.

A CSP 1900 shown in FIG. 11 may include a light-emitting stack structure S, first and second terminals Ta and Tb, the phosphor layer 1907, and the lens 1920 disposed on a substrate 1911.

The light-emitting stack structure S may be a stack structure including first and second-conductivity-type semiconductor layers 1904 and 1906 and an active layer 1905 disposed therebetween. In the present exemplary embodiment, the first- and second-conductivity-type semiconductor layers 1904 and 1906 may be p- and n-type semiconductor layers, respectively. Also, the first- and second-conductivity-type semiconductor layers 1904 and 1906 may be formed of a nitride semiconductor, for example, $Al_xIn_yGa_{(1-x-y)}N$ (0<x<1, 0<y<1, 0<x+y<1). However, in addition to the nitride semiconductor, the first- and second-conductivity-type semiconductor layers 1904 and 1906 may be formed of a GaAs-based semiconductor or a GaP-based semiconductor.

The active layer 1905 formed between the first and second-conductivity-type semiconductor layers 1904 and 1906 may emit light having a predetermined energy due to re-combination between electrons and holes, and have an MQW structure in which a quantum well layer and a quantum barrier layer are alternately stacked. For example, an InGaN/GaN structure or an AlGaN/GaN structure may be used as the MQW structure.

Meanwhile, the first- and second-conductivity-type semiconductor layer 1904 and 1906 and the active layer 1905 may be formed using a semiconductor layer growth apparatus, such as an MOCVD apparatus, a molecular beam epitaxy (MBE) apparatus, or a hydride vapor phase epitaxy (HVPE) apparatus, which may perform a method of sensing an internal gas leak, according to an exemplary embodiment.

The light-emitting device 1910 shown in FIG. 11 may have a surface from which a growth substrate is removed, and a rough portion P may be formed on the surface from which the growth substrate is removed. Also, the phosphor layer 1907 may be applied as a light conversion layer to the surface of the light-emitting device 1910 on which the rough portion P is formed.

The light-emitting device 1910 may include first and second electrodes 1909a and 1909b connected to the first and second-conductivity-type semiconductor layers 1904 and 1906, respectively. The first electrode 1909a may include a conductive via 1908 formed through the second-conductivity-type semiconductor layer 1906 and the active layer 1905 and connected to the second-conductivity-type semiconductor layer 1904. An insulating layer 1903 may be formed between the conductive via 1908 and the active layer 1905 and the second-conductivity-type semiconductor layer 1906 to prevent a short occurring.

Although only one conductive via 1908 is provided as an example, at least two conductive vias may be provided to facilitate current spreading and may be arranged in various shapes. The conductive vias 1908 may be arranged in the same manner as in FIG. 8.

The present exemplary embodiment describes an example in which the mounting substrate 1911 is a supporting substrate (e.g., a silicon substrate) to which a semiconductor process may be easily applied, but the inventive concept is not limited thereto. The mounting substrate 1911 and the light-emitting device 1910 may be bonded to each other by bonding layers 1902 and 1912. The bonding layers 1902 and 1912 may be formed of an insulating material or a conductive material. For example, the insulating material may be an oxide such as $SiO_2$ or SiN or a resin-based material such as a silicon resin or an epoxy resin, and the conductive material may be Ag, Al, Ti, W, Cu, Sn, Ni, Pt, Cr, NiSn, TiW, AuSn, or a eutectic metal thereof. The bonding process may include applying the first and second bonding layers 1902 and 1912 to bonding surfaces of the light-emitting device 1910 and the substrate 1911 and bonding the light-emitting device 1910 and the substrate 1911.

A via may be formed in the mounting substrate 1911 from a bottom surface of the mounting substrate 1911 and may be connected to the first and second electrodes 1909a and 1909b of the bonded light-emitting device 1910. An insulating material 1913 may be formed on a side surface of the via and the bottom surface of the mounting substrate 1911. When the mounting substrate 1911 is a silicon substrate, the insulating material 1913 may be a silicon oxide layer formed using a thermal oxidation process. The via may be filled with a conductive material to form first and second terminals Ta and Tb connected to the first and second electrodes 1909a and 1909b. The first and second terminal Ta and Tb may include seed layers 1918a and 1918b and plating filling units 1919a and 1919b formed by performing a plating process using the seed layers 1918a and 1918b.

Figure 12:
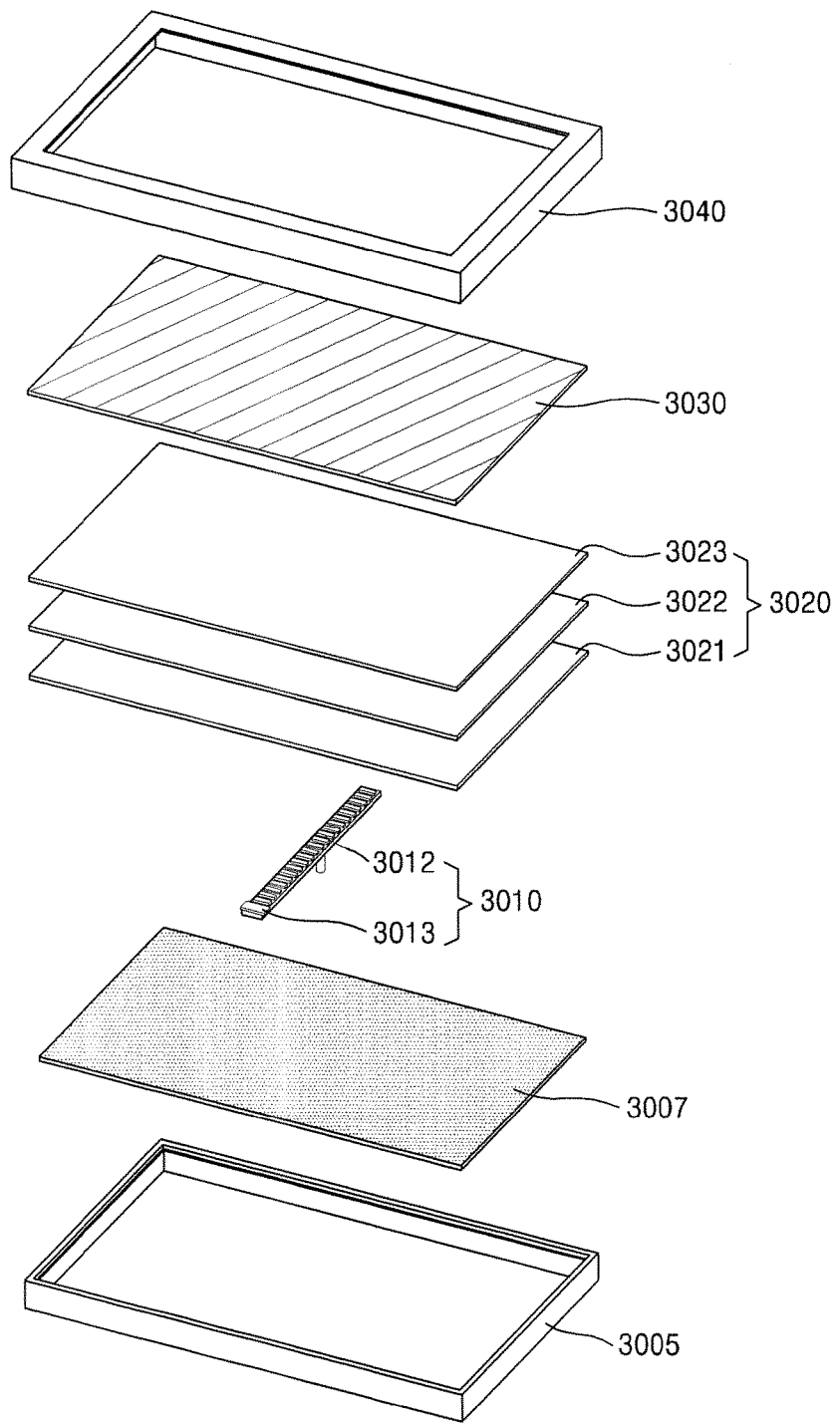
FIG. 12 is an exploded perspective view of an example of a backlight assembly including a light-emitting device array unit in which an LED chip manufactured using a method of manufacturing an LED chip, according to an exemplary embodiment is arranged.

FIG. 12 is an exploded perspective view of an example of a backlight (BL) assembly including a light-emitting device array unit in which an LED chip manufactured using a method of manufacturing an LED chip, according to an exemplary embodiment, is arranged. As shown in FIG. 12, a direct-light-type BL assembly 3000 may include a lower cover 3005, a reflection sheet 3007, a light-emitting module 3010, an optical sheet 3020, a liquid crystal (LC) panel 3030, and an upper cover 3040. A light-emitting device array unit, according to an exemplary embodiment, may be used as the light-emitting module 3010 included in the direct-light-type BL assembly 3000.

According to an exemplary embodiment, the light-emitting module 3010 may include a light-emitting device array 3012 including at least one light-emitting device package and a circuit substrate and a rank information storage unit 3013. As in the above-described exemplary embodiments, the rank information storage unit 3013 may store rank information of the light-emitting device array 3012. The light-emitting device array 3012 may receive power for emitting light from a light-emitting device driver disposed outside the direct-light-type BL assembly 3000, and the light-emitting device driver may sense the rank information of the light-emitting device array 3012 stored in the rank information storage unit 3013, and control current supplied to the light-emitting device array 3012 based on the sensed rank information.

The optical sheet 3020 may be provided on the light-emitting module 3010 and include a diffusion sheet 3021, a condensing sheet 3022, and a protection sheet 3023. That is, the diffusion sheet 3021 configured to diffuse light emitted by the light-emitting module 3010, the condensing sheet 3022 configured to condense the light diffused by the diffusion sheet 3021 and increase luminance, and the protection sheet 3023 configured to protect the condensing sheet 3012 and ensure a view angle may be sequentially prepared on the light-emitting module 3010.

The upper cover 3040 may enclose an edge of the optical sheet 3020 and be assembled with the lower cover 3005.

The LC panel 3030 may be further provided between the optical sheet 3020 and the upper cover 3040. The LC panel 3030 may include a pair of a first substrate (not shown) and a second substrate (not shown), which may be bonded to each other with an LC layer therebetween. A plurality of gate lines may intersect a plurality of data lines to define pixel regions on the first substrate. Thin-film transistors (TFTs) may be respectively provided at intersections between the pixel regions, and may correspond one-to-one to and be connected to pixel electrodes mounted on the respective pixel regions. The second substrate may include red (R), green (G), and blue (B) color filters respectively corresponding to the pixel regions and a black matrix covering edges of the respective color filters, the gate lines, the data lines, and the TFTs.

Figure 13:
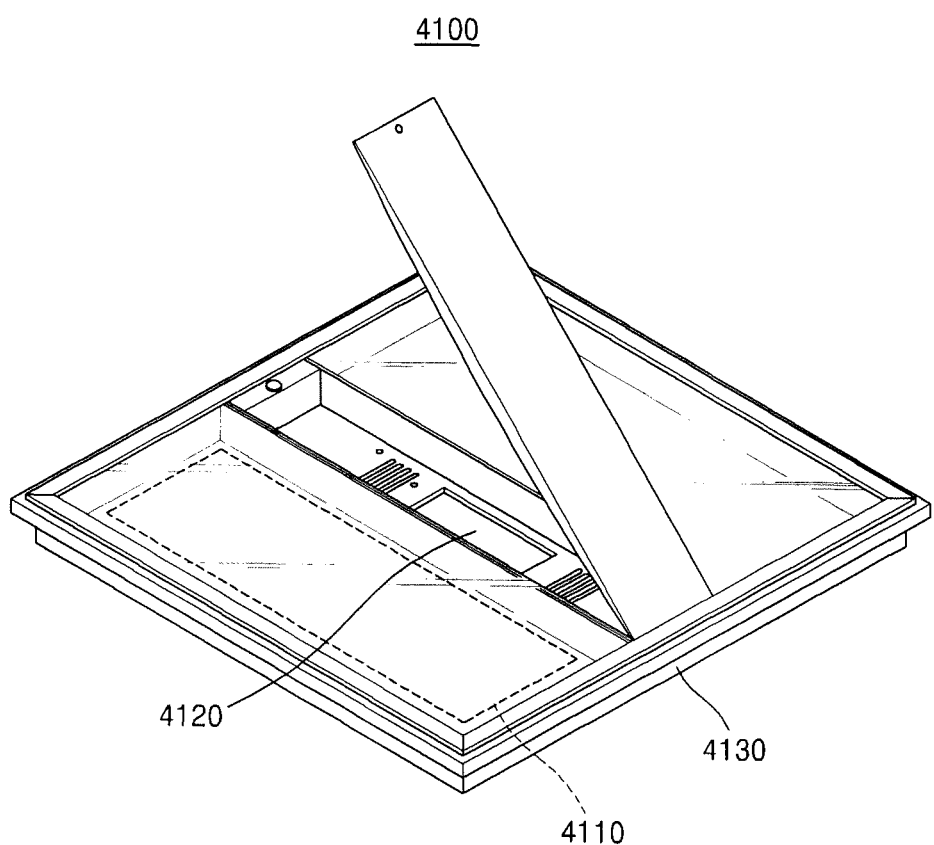
FIG. 13 is a schematic diagram of a flat-panel illumination system including a light-emitting device array unit and a light-emitting device module in which an LED chip manufactured using a method of manufacturing an LED chip, according to an exemplary embodiment is arranged.

FIG. 13 is a schematic diagram of a flat-panel illumination system 4100 including a light-emitting device array unit and a light-emitting device module in which an LED chip manufactured using a method of manufacturing an LED chip, according to an exemplary embodiment, is arranged. The flat-panel illumination system 4100 may include a light source 4110, a power supply device 4120, and a housing 4130. According to an exemplary embodiment, the light source 4110 may include the above-described light-emitting device array unit, and the power supply device 4120 may include the above-described light-emitting device driver.

The light source 4110 may include a light-emitting device array unit and have an overall plane shape as shown in FIG. 13. According to an exemplary embodiment, the light-emitting device array unit may include a light-emitting device array and a rank information storage unit configured to store rank information of the light-emitting device array.

The power supply device 4120 may be configured to supply power to the light source 4110. According to an exemplary embodiment, the power supply device 4120 may include a variable current output unit and a rank sensing unit. The variable current output unit and the rank sensing unit may respectively serve the same functions as a variable current output unit and a rank sensing unit included in any one of the exemplary embodiments.

The housing 4130 may include a containing space in which the light source 4110 and the power supply device 4120 are contained, and have a hexahedral shape having one open side surface, but the present exemplary embodiment is not limited thereto. The light source 4110 may be disposed to emit light toward the open side surface of the housing 4130.

Figure 14:
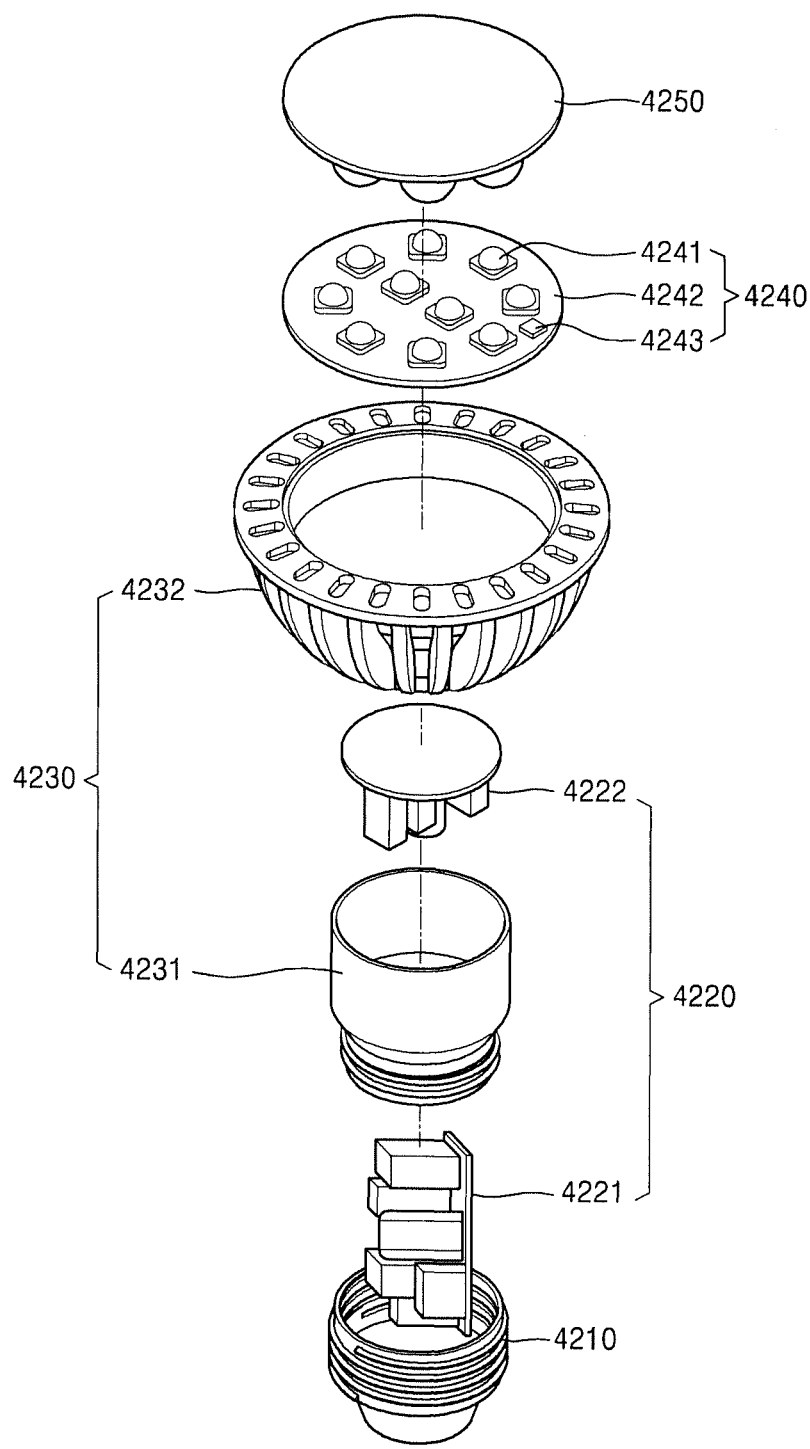
FIG. 14 is a schematic diagram of a bulb-type lamp, which is an illumination system including a light-emitting device array unit and a light-emitting device module in which an LED chip manufactured using a method of manufacturing an LED chip, according to an exemplary embodiment, is arranged.
Figure 15:
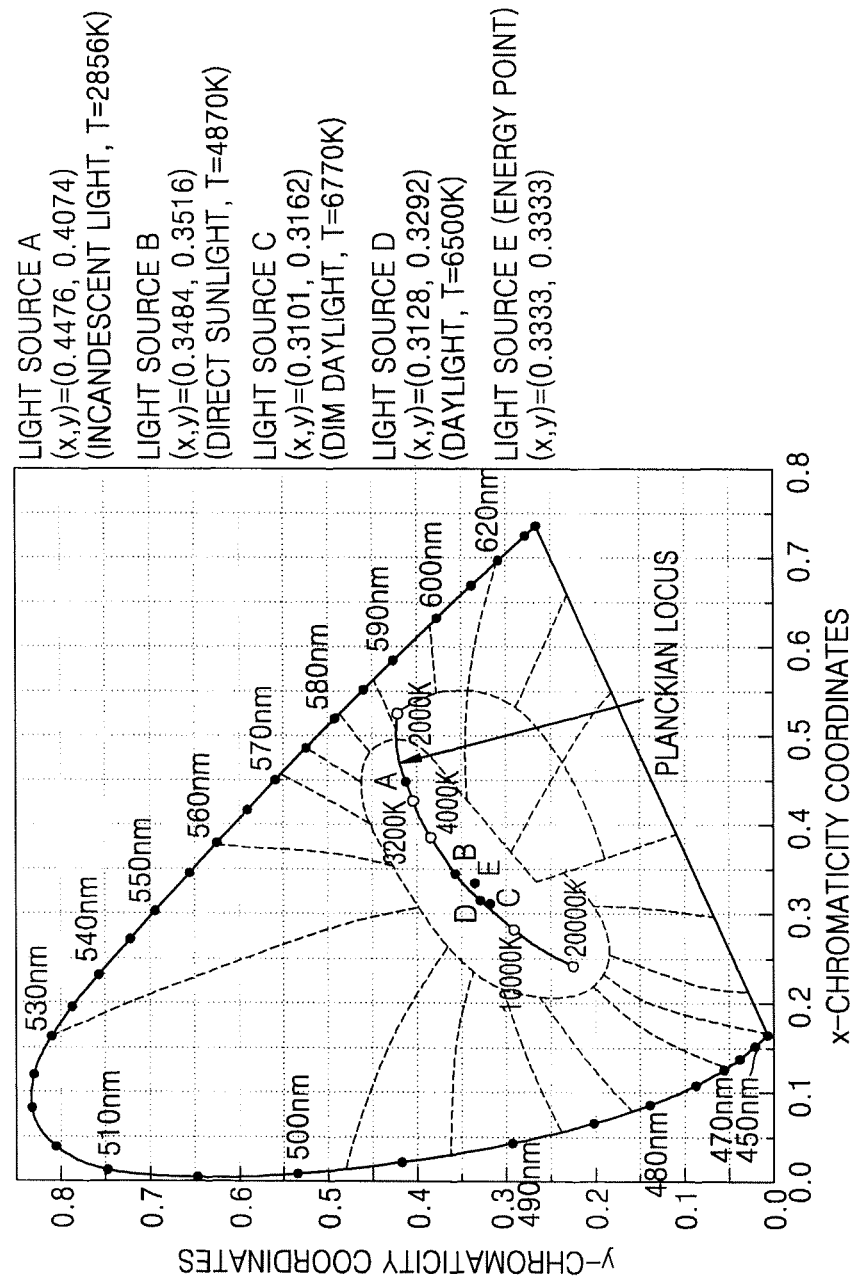
FIG. 15 is an international commission on illumination (CIE) chromaticity diagram of a complete radiator spectrum.

FIG. 14 is a schematic diagram of a bulb-type lamp, which is an illumination system 4200 including a light-emitting device array unit and a light-emitting device module in which an LED chip manufactured using a method of manufacturing an LED chip, according to an exemplary embodiment, is arranged. FIG. 15 is an international commission on illumination (CIE) chromaticity diagram of a complete radiator spectrum. The illumination system 4200 may include a socket 4210, a power source unit 4220, a radiation unit 4230, a light source 4240, and an optical unit 4250. According to an exemplary embodiment, the light source 4240 may include the above-described light-emitting device array unit, and the power source unit 4220 may include the above-described light-emitting device driver.

The socket 4210 may be configured to be capable of being replaced by a illumination system of the related art. Power supplied to the illumination system 4200 may be applied through the socket 4210. As shown in FIG. 14, the power source unit 4220 may be formed by assembling a first power source unit 4221 and a second power source unit 4222. The power source unit 4220 may include a light-emitting device driver, according to exemplary embodiments. That is, the power source unit 4220 may include a variable current output unit and a rank sensing unit, which may respectively serve the same functions as a variable current output unit and a rank sensing unit, according to any one of the exemplary embodiments.

The radiation unit 4230 may include an internal radiation unit 4231 and an external radiation unit 4232. The internal radiation unit 4131 may be directly connected to the light source 4240 and/or the power source unit 4220 so that heat may be transmitted to the external radiation unit 4232. The optical unit 4250 may include an internal optical unit (not shown) and an external optical unit (not shown) and may be configured to uniformly disperse light emitted by the light source 4240.

The light source 4240 may receive power from the power source unit 4220 and emit light to the optical unit 4250. The light source 4240 may include a light-emitting device array unit, according to one of the exemplary embodiments. The light source 4240 may include at least one light-emitting device package 4241, a circuit substrate 4242, and a rank information storage unit 4243, and the rank information storage unit 4243 may store rank information of light-emitting device packages 4241.

A plurality of light-emitting device packages 4241 included in the light source 4240 may be of the same kind to generate light having the same wavelength. Alternatively, the plurality of light-emitting device packages 4241 included in the light source 4240 may be of different kinds to generate light having different wavelengths. For example, the light-emitting device package 4241 may include a blue light-emitting device, a white light-emitting device manufactured by combining yellow, green, red, or orange phosphors, and at least one of violet, blue, green, red, or infrared (IR) light-emitting devices so as to control a color temperature of light and a color rendering index (CRI). Alternatively, when an LED chip emits blue light, a light-emitting device package including at least one of yellow, green, and red phosphors may be configured to emit white light having various color temperatures according to a combination ratio of the phosphors. Alternatively, a light-emitting device package in which a green or red phosphor is applied to the blue LED chip may be configured to emit green or red light. The light-emitting device package configured to emit white light may be combined with the light-emitting device package configured to emit green or red light so as to control a color temperature and CRI of white light. Also, the light-emitting device package 4241 may include at least one of light-emitting devices configured to emit violet, blue, green, red, or IR light. In this case, the illumination system 4200 may control CRI in sodium (Na) to the level of sunlight, and generate various white light beams at a color temperature of about 1500K to about 20000K. When necessary, the illumination system 4200 may generate violet, blue, green, red, or orange visible light or IR light and control color of illumination according to an ambient atmosphere or mood. Also, the illumination system 4200 may generate light having a specific wavelength to facilitate growth of plants.

White light generated by a combination of the blue light-emitting device with yellow, green, red phosphor and/or green and red light-emitting devices may have at least two peak wavelengths. As shown in FIG. 15, coordinates (x, y) of the white light in a CIE 1931 coordinate system may be located on a segment connecting (0.4476, 0.4074), (0.3484, 0.3516), (0.3101, 0.3162), (0.3128, 0.3292), and (0.3333, 0.3333) or located in a region surrounded with the segment and a blackbody radiator spectrum. A color temperature of the white light may be between 1500K and 20000K.

Figure 16A:
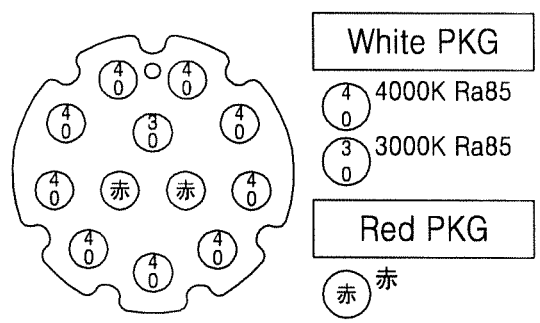
FIGS. 16A and 16B are diagrams of an example of a light-emitting device package in which an LED chip manufactured using a method of manufacturing an LED chip, according to an exemplary embodiment, is arranged.
Figure 16B:
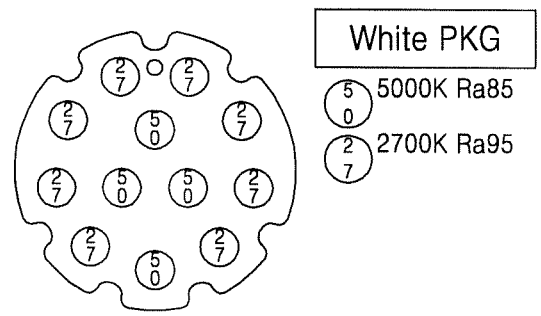

FIGS. 16A and 16B are diagrams of an example of a light-emitting device package in which an LED chip manufactured using a method of manufacturing an LED chip, according to an exemplary embodiment, is arranged.

Referring to FIG. 16A and FIG. 16B, for example, a white light-emitting package module of which a color temperature may be controlled within a range of about 2000K to about 4000K and CRI (Ra) is about 85 to about 99 may be manufactured by combining a white light-emitting device package having a color temperature of about 4000K and a red light-emitting device package having a color temperature of about 3000K.

In other exemplary embodiments, a white light-emitting package module of which a color temperature may be controlled within a range of about 2700K to about 5000K and CRI (Ra) is about 85 to about 99 may be manufactured by combining a white light-emitting device package having a color temperature of about 2700K and a white light-emitting device package having a color temperature of about 5000K.

The number of light-emitting device packages having respective color temperatures may mainly depend on a default color temperature. In an illumination system of which a default color temperature is about 4000K, the number of light-emitting device packages having a color temperature of about 4000K may be set to be larger than the number of light-emitting device packages having a color temperature of about 4000K or the number of red light-emitting device packages.

Phosphors may have formulas and colors as follows.

Oxide-based phosphors: yellow and green $Y_3Al_5O_{12}$:Ce, $Tb_3Al_5O_{12}$:Ce, $Lu_3Al_5O_{12}$:Ce Silicate-based phosphors: yellow and green $(Ba,Sr)_2SiO_4$:Eu, yellow and orange $(Ba,Sr)_3SiO_5$:Ce Nitride-based phosphors: green β-SiAlON:Eu, yellow $La_3Si_6N_{11}$:Ce, orange α-SiAlON:Eu, red $CaAlSiN_3$:Eu, $Sr_2Si_5N_8$:Eu, $SrSiAl_4N_7$:Eu, $SrLiAl_3N_4$:Eu, $Ln_{4-x}(Eu_zM_{1-z})_xSi_{12-y}Al_yO_{3+x+y}N_{18-x-y}$ $(0.5 \leq x \leq 3, 0 < z < 0.3, 0 < y \leq 4)$     Formula (1)

In Formula (1), Ln may be at least one element selected from the group consisting of a Group Ma element and a rare-earth element, and M may be at least one element selected from the group consisting of calcium (Ca), barium (Ba), strontium (Sr), and magnesium (Mg).

Fluoride-based phosphors: KSF-based red $K_2SiF_6$:$Mn_{4+}$, $K_2TiF_6$:$Mn_{4+}$, $NaYF_4$:$Mn_{4+}$, $NaGdF_4$:$Mn_{4+}$ Compositions of the phosphors should be based on stoichiometry, and respective elements may be replaced by other elements in respective groups in the periodic table. For example, Sr may be replaced by Group II elements (alkaline earths), such as Ba, Ca, or Mg, and Y may be replaced by a lanthanum-based element, such as Tb, Lu, Sc, or Gd. Also, europium (Eu) serving as an activator may be replaced by cerium (Ce), terbium (Tb), praseodymium (Pr), erbium (Er), or ytterbium (Yb) according to a desired energy level. An activator may be used alone or a co-activator may be further applied to vary characteristics.

Furthermore, materials, such as quantum dots (QDs), may be used as materials capable of replacing phosphors, and phosphors and QDs may be used alone or in combination with one another.

A QD may have a structure including a core (about 3 nm to about 10 nm), such as CdSe or InP, a shell (about 0.5 nm to about 2 nm), such as ZnS and ZeSe, and a ligand for stabilizing the core and the shell, and may be embodied in various colors according to size.

Although the present exemplary embodiment describes a case in which a wavelength conversion material is contained in an encapsulant, the wavelength conversion material may be bonded as a film type on a top surface of an LED chip or coated to a uniform thickness on the top surface of the LED chip.

The following Table 1 shows types of phosphors in respective fields to which a white light-emitting device using a blue LED chip (about 440 nm to about 460 nm) is applied.

TABLE 1

| Purpose | Phosphor |
| --- | --- |
| LED TV BLU | β-SiAlON: $Eu^{2+}$ |
|  | (Ca, Sr)AlSiN$_3$: $Eu^{2+}$ |
|  | La$_3$Si$_6$N$_{11}$: $Ce^{3+}$ |
|  | K$_2$SiF$_6$: $Mn^{4+}$ |
|  | SrLiAl3N4: Eu |
|  | Ln$_{4-x}$(Eu$_z$M$_{1-z}$)$_x$Si$_{12-y}$Al$_y$O$_{3+x+y}$N$_{18-x-y}$ |
|  | $(0.5 \leq x \leq 3, 0 < z < 0.3, 0 < y \leq 4)$ |
|  | K2TiF6: Mn4+ |
|  | NaYF4: Mn4+ |
|  | NaGdF4: Mn4+ |

TABLE 1-continued

| Purpose | Phosphor |
|---|---|
| Illumination | $Lu_3Al_5O_{12}$: Ce3+ |
| | Ca-α-SiAlON: Eu2+ |
| | $La_3Si_6N_{11}$: Ce3+ |
| | (Ca, Sr)AlSiN$_3$: Eu2+ |
| | $Y_3Al_5O_{12}$: Ce3+ |
| | $K_2SiF_6$: Mn4+ |
| | SrLiAl3N4: Eu |
| | $Ln_{4-x}(Eu_zM_{1-z})_xSi_{12-y}Al_yO_{3+x+y}N_{18-x-y}$ |
| | ($0.5 \leq x \leq 3, 0 < z < 0.3, 0 < y \leq 4$) |
| | K2TiF6: Mn4+ |
| | NaYF4: Mn4+ |
| | NaGdF4: Mn4+ |
| Side View (Mobile, Note PC) | $Lu_3Al_5O_{12}$: Ce3+ |
| | Ca-α-SiAlON: Eu2+ |
| | $La_3Si_6N_{11}$: Ce3+ |
| | (Ca, Sr)AlSiN3: Eu2+ |
| | $Y_3Al_5O_{12}$: Ce3+ |
| | (Sr, Ba, Ca, Mg)2SiO4: Eu2+ |
| | $K_2SiF_6$: Mn4+ |
| | SrLiAl3N4: Eu |
| | $Ln_{4-x}(Eu_zM_{1-z})_xSi_{12-y}Al_yO_{3+x+y}N_{18-x-y}$ |
| | ($0.5 \leq x \leq 3, 0 < z < 0.3, 0 < y \leq 4$) |
| | K2TiF6: Mn4+ |
| | NaYF4: Mn4+ |
| | NaGdF4: Mn4+ |
| Interior (Head Lamp, etc.) | $Lu_3Al_5O_{12}$: Ce3+ |
| | Ca-α-SiAlON: Eu2+ |
| | $La_3Si_6N_{11}$: Ce3+ |
| | (Ca, Sr)AlSiN$_3$: Eu2+ |
| | $Y_3Al_5O_{12}$: Ce3+ |
| | $K_2SiF_6$: Mn4+ |
| | SrLiAl3N4: Eu |
| | $Ln_{4-x}(Eu_zM_{1-z})_xSi_{12-y}Al_yO_{3+x+y}N_{18-x-y}$ |
| | ($0.5 \leq x \leq 3, 0 < z < 0.3, 0 < y \leq 4$) |
| | K2TiF6: Mn4+ |
| | NaYF4: Mn4+ |
| | NaGdF4: Mn4+ |

Figure 17:
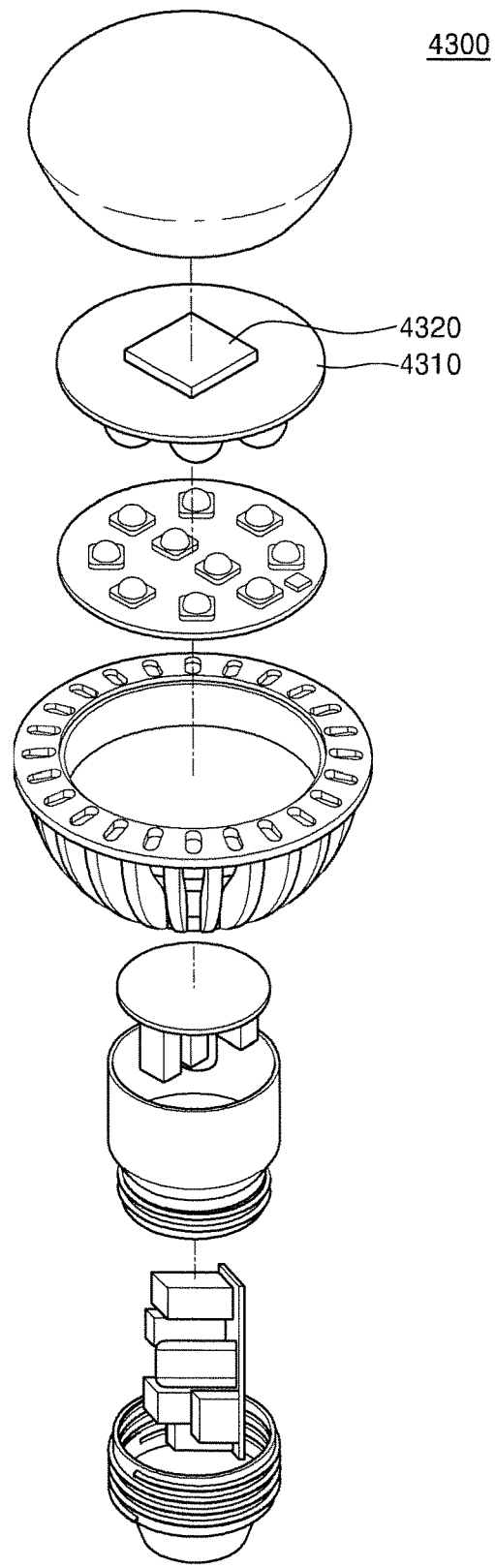
FIG. 17 is a diagram of a lamp that includes a light-emitting device array unit and a light-emitting device module in which an LED chip manufactured using a method of manufacturing an LED chip, according to an exemplary embodiment, is arranged, and includes a communication module.

FIG. 17 is a diagram of a lamp 4300 that includes a light-emitting device array unit and a light-emitting device module in which an LED chip manufactured using a method of manufacturing an LED chip, according to an exemplary embodiment, is arranged, and includes a communication module 4320.

The lamp 4300 of FIG. 17 may differ from the illumination system 4200 of FIG. 14 in that a reflection plate 4310 is disposed on a light source 4240. The reflection plate 4310 may be configured to uniformly disperse light emitted by the light source 4240 sideward and backward and reduce light dazzle.

The communication 4320 may be mounted on the reflection plate 4310, and home-network communications may be enabled via the communication module 4320. For example, the communication module 4320 may be a wireless communication module using Zigbee, and control household illumination (i.e., turning-on/off of a lamp and control of brightness) by means of a smartphone or a wireless controller.

Figure 18:
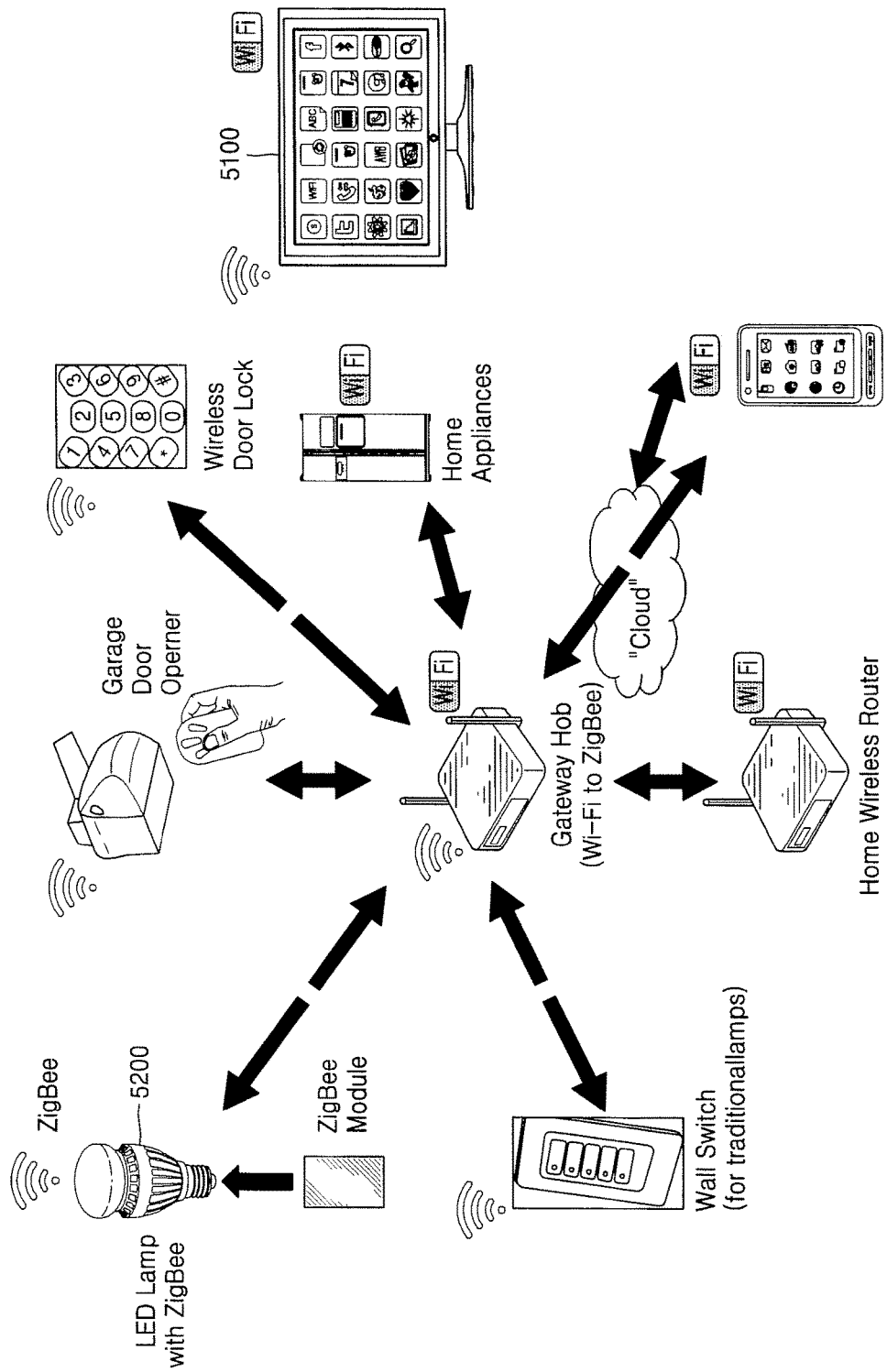
FIG. 18 is a diagram of an example in which a lamp including a light-emitting device array unit and a light-emitting device module in which an LED chip manufactured using a method of manufacturing an LED chip, according to an exemplary embodiment, is arranged, is applied to a home-network.

FIG. 18 is a diagram of an example in which a lamp 5200 including a light-emitting device array unit and a light-emitting device module in which an LED chip manufactured using a method of manufacturing an LED chip, according to an exemplary embodiment, is arranged, is applied to a home-network. The home-network may automatically control brightness of the lamp 5200 using household wireless communications (e.g., Zigbee and WiFi) depending on operation states of a bedroom, a living room, a front door, a storage closet, and household appliances and ambient environments and statuses.

For example, as shown in FIG. 18, the brightness of the lamp 5200 may be automatically controlled depending on the type of a TV program viewed on a TV 5100 or the brightness of a screen of the TV 5100. When a drama is shown on the TV 5100 and a cozy atmosphere is needed, a color temperature of the lamp 5200 may be reduced to about 12000K or lower and the impression of colors may be controlled. In contrast, when a comedy program is shown in a light-hearted atmosphere, a color temperature of the lamp 5200 may be increased to about 12000K or higher, and the lamp 5200 may be controlled in bluish white colors.

Figure 19:
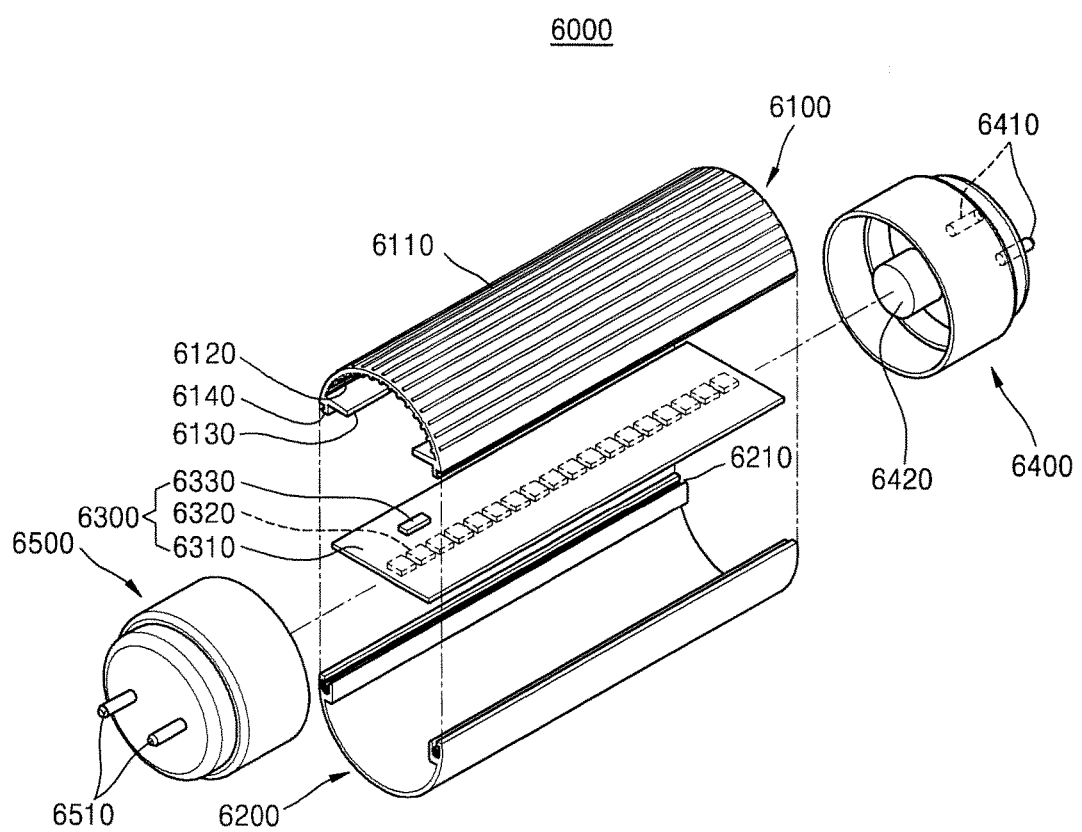
FIG. 19 is an exploded perspective view of a light-emitting device including a light-emitting device array unit and a light-emitting device module in which an LED chip manufactured using a method of manufacturing an LED chip, according to an exemplary embodiment, is arranged.

FIG. 19 is an exploded perspective view of a light-emitting device 6000 including a light-emitting device array unit and a light-emitting device module in which an LED chip manufactured using a method of manufacturing an LED chip, according to an exemplary embodiment, is arranged. As shown in FIG. 19, the light-emitting device 6000 may include a radiation member 6100, a cover 6200, a light-emitting module 6300, a first socket 6400, and a second socket 6500.

A plurality of radiation pins 6110 and 6120 may be formed as a rough type on inner and/or surfaces of the radiation member 6100. The radiation pins 6110 and 6120 may be designed to have various shapes and intervals. A protruding support 6130 may be formed in the radiation member 6100. The light-emitting module 6300 may be fixed to the protruding support 6130. Clasps 6140 may be formed at both ends of the radiation member 6100.

Clasp grooves 6210 may be formed at the cover 6200, and the clasps 6140 of the radiation member 6100 may be hook-combined with the clasp grooves 6210. Positions of the clasp grooves 6210 and the clasps 6140 may be exchanged.

The light-emitting module 6300 may include the light-emitting device array unit, according to the above-described exemplary embodiment. The light-emitting module 6300 may include a printed circuit board (PCB) 6310, a light-emitting device array 6320, and a rank information storage unit 6330. As described above, the rank information storage unit 6330 may store rank information of the light-emitting device array 6320. Circuit interconnections for operating the light-emitting device array 6320 may be formed on the PCB 6310. Also, the light-emitting module 6300 may include components for operating the light-emitting device array 6320.

The first and second sockets 6400 and 6500, which are a pair of sockets, may be combined with both ends of a cylindrical cover unit including the radiation member 6100 and the cover 6200.

For example, the first socket 6400 may include electrode terminals 6410 and a power source device 6420, and dummy terminals 6510 may be disposed in the second socket 6500. The power source device 6420 may include a light-emitting device driver, according to the above-described exemplary embodiments. Specifically, the power source device 6420 may include a variable current output unit and a rank sensing unit, and the variable current output unit and the rank sensing unit may respectively serve the same functions as a variable current output unit and a rank sensing unit included in any one of the exemplary embodiments.

Furthermore, an optical sensor module may be embedded in any one of the first socket 6400 or the second socket 6500. For example, the optical sensor module may be embedded in the second socket 6500 in which the dummy terminals 6510 are disposed. In another example, the optical sensor module may be embedded in the first socket 6400 including the dummy terminals 6510.

While the inventive concept has been particularly shown and described with reference to exemplary embodiments thereof, it will be understood that various changes in form and details may be made therein without departing from the spirit and scope of the following claims.

What is claimed is:

1. A method of inspecting for an internal leak of gas in a gas line, the method comprising:
   providing an internal gas leak inspection device including a main valve and a pressure gauge in a main line between a first valve and a second valve installed in the gas line;
   forming an airtight space in the main line by shielding the main valve and the second valve;
   measuring a pressure variation of the airtight space using the pressure gauge; and
   determining whether or not the gas leak occurs, based on the measured pressure variation,
   wherein an inner pressure of the airtight space is higher than an inner pressure of an upstream line of the main valve and an inner pressure of a downstream line of the second valve.

2. The method of claim 1, wherein the main valve is a pneumatic valve.

3. The method of claim 1, wherein the gas line is a chamber cleaning gas line of a chemical vapor deposition (CVD) apparatus or a portion thereof.

4. The method of claim 1, wherein the gas is chlorine gas.

5. The method of claim 1, wherein an interior of the airtight space is in a vacuum state.

6. The method of claim 1, wherein the internal gas leak inspection device further comprises a monitoring device showing results obtained by measuring the pressure variation of the airtight space.

7. The method of claim 6, wherein the monitoring device generates an alarm when a pressure variation is equal to or greater than a predetermined value.

8. The method of claim 1, wherein the internal gas leak inspection device further comprises a detector detecting elements of gas in the main line.

9. A method of inspecting for an internal leak of gas in a gas line, the method comprising steps of:
   providing a main valve and a second valve to the gas line and a pressure gauge sensing an internal pressure of the gas line between the main valve and the second valve;
   forming an airtight space between the main valve and the second valve, wherein an inner pressure of the airtight space is higher than an inner pressure of an upstream line of the main valve and an inner pressure of a downstream line of the second valve; and
   determining whether an internal gas leak occurs, based on a pressure variation sensed by the pressure gauge, when the main valve and the second valve are turned off.

10. The method of claim 9, wherein the main valve is connected to a gas supply and the second valve is connected to a chamber.

11. The method of claim 9, further comprising a step of providing a positive pressure differential from the gas line between the main valve and the second valve to any other portion of the gas line connected to the main valve or the second valve, or providing a negative pressure differential from the gas line between the main valve and the second valve to any other portion of the gas line connected to the main valve or the second valve.

12. The method of claim 9, further comprising a step of detecting elements of gas in the gas line between the main valve and the second valve.

13. The method of claim 9, further comprising a step of providing a first valve connected to the gas line, wherein the main valve is disposed between the first valve and the second valve.

* * * * *